Jan. 30, 1962 J. DECKER ET AL 3,018,590
GRINDING MACHINE FEED MECHANISM
Filed Oct. 13, 1959 10 Sheets-Sheet 1

INVENTORS
JACOB DECKER
BERTRAM H. STEINHARD
BY Howard S. Keiser
& John F. Verhoeven
ATTORNEYS INVENTORS
JACOB DECKER
BERTRAM H. STEINHARD
BY Howard Kaiser
& John F. Verhoeven
ATTORNEYS INVENTORS
JACOB DECKER
BERTRAM H. STEINHARD
BY Howard Skinner
& John F. Verhoeven
ATTORNEYS Jan. 30, 1962  J. DECKER ET AL  3,018,590
GRINDING MACHINE FEED MECHANISM
Filed Oct. 13, 1959  10 Sheets-Sheet 5

INVENTORS
JACOB DECKER
BERTRAM H. STEINHARD
BY
ATTORNEYS

INVENTORS
JACOB DECKER
BERTRAM H. STEINHARD
BY
ATTORNEYS

Jan. 30, 1962     J. DECKER ET AL     3,018,590
GRINDING MACHINE FEED MECHANISM
Filed Oct. 13, 1959     10 Sheets-Sheet 7

INVENTORS
JACOB DECKER
BERTRAM H. STEINHARD
BY
ATTORNEYS

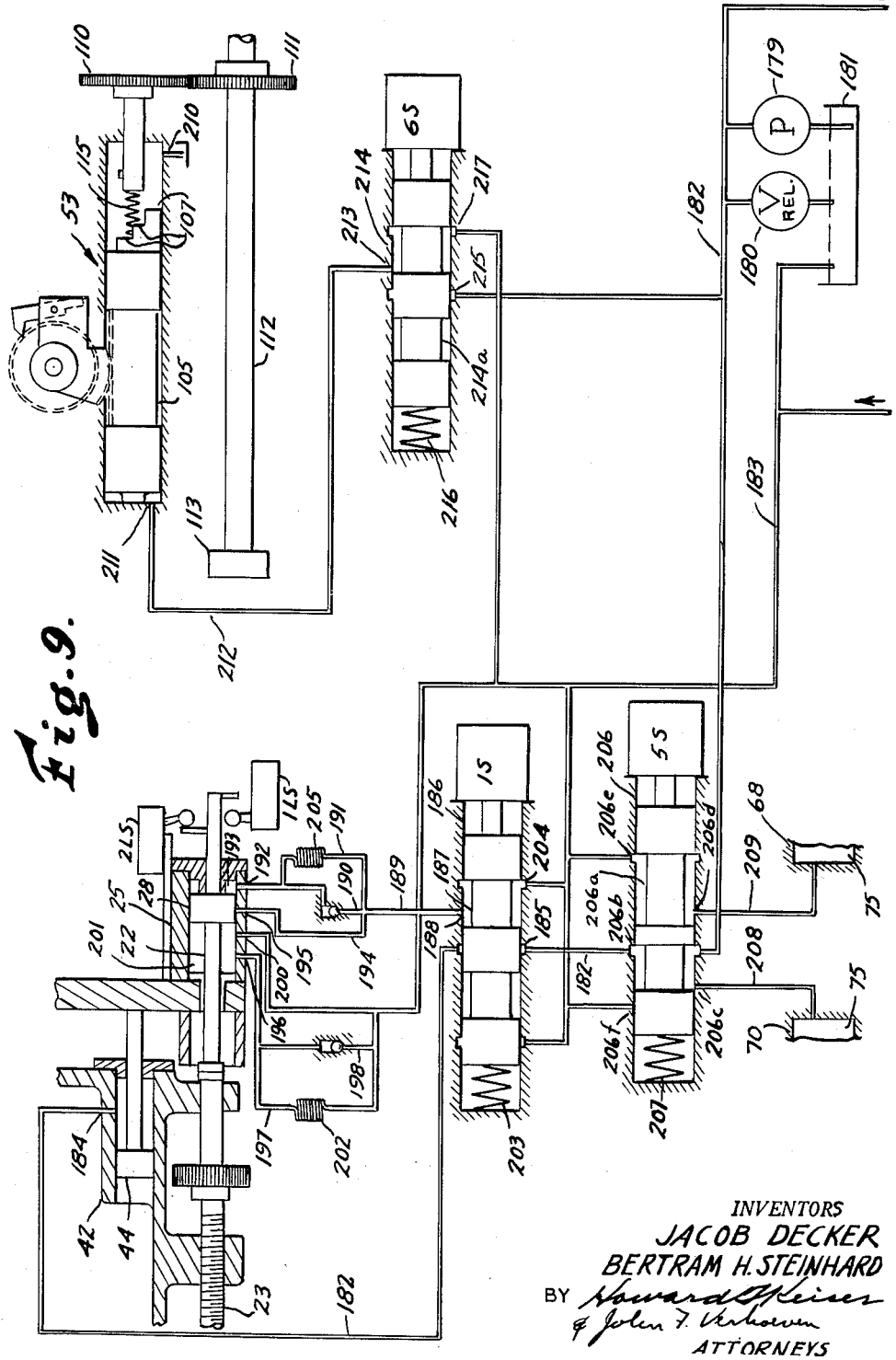

INVENTORS
JACOB DECKER
BERTRAM H. STEINHARD
BY
ATTORNEYS

United States Patent Office 3,018,590
Patented Jan. 30, 1962

3,018,590
GRINDING MACHINE FEED MECHANISM
Jacob Decker and Bertram H. Steinhard, Cincinnati, Ohio, assignors to The Cincinnati Milling Machine Co., Cincinnati, Ohio, a corporation of Ohio
Filed Oct. 13, 1959, Ser. No. 846,195
27 Claims. (Cl. 51—165)

The present invention relates to grinding machines and more particularly to the feeding mechanism therefor.

A common structure in grinding machines for moving the wheelhead thereof on the bed ways of the machine towards and away from the workpiece consists of a shaft mounted in the bed and threadedly engaged with a portion of the wheelhead depending between the ways into the bed. One end of the shaft may be connected to the piston of a rapid advance cylinder, for rapid shifting of the wheelhead toward the workpiece, while the other end of the shaft may be connected to power driven means for rotation of the shaft, after the rapid advance, and consequent slower feeding movement of the wheelhead toward the workpiece. With this typical construction it is difficult to align precisely the shaft receiving opening in the depending portion of the wheelhead with the shaft mounted in the bed. Misalignment will make the shaft more difficult to turn in the wheelhead and, in some circumstances, can cause sticking or binding. The rotation of the threaded shaft in the wheelhead during each cycle is a potential source of heat in the wheelhead and, if the shaft is misaligned relative to the threaded opening in the wheelhead, fluctuating temperatures can be caused in the wheelhead which will affect the accuracy of the grinding operation. Moreover, any misalignment of the shaft in the wheelhead will promote wear in the threads on these members and, despite mechanism to eliminate backlash therebetween, accurate grinding will become more difficult.

In the present invention a novel shaft construction is provided which eliminates many of the problems inherent in the conventional construction. In the preferred embodiment, instead of a single shaft, three separate shafts are used which are arranged in general alignment for end to end engagement. The two end shafts are mounted in the base while the center shaft is mounted in a depending portion of the wheelhead and threadedly engaged therewith. During each cycle the center shaft, which is constantly urged against the rear shaft, is rapidly moved, by the rear shaft, up to and urged against the forward shaft. The feeding movement of the wheelhead is effected, not by rotation of the threaded shaft mounted in the wheelhead, but by relative rotation between a nut mounted in the base and the forward shaft which is threadedly received in the nut. Thus, for feeding movement, the wheelhead is clamped between rear and forward abutting shafts mounted in the base, but is not connected thereto, so precise alignment of the wheelhead with the shafts is not required. Moreover, since the forward feeding movement is effected through a shaft and nut mounted in the base, and not the shaft mounted in the wheelhead, any heat generated thereby during the cycle is not transmitted to the wheelhead. It is therefore one object of the present invention to clamp the wheelhead between two abutting members mounted in the base for feeding movement to obviate the need for precise alignment of the wheelhead relative to a shaft mounted in the base.

Novel means are provided for axially advancing the forward, or feed, shaft to obtain precisely controlled feeding movement. In the preferred form, the feed shaft is received in a nut mounted in the base which is operatively connected, for rotation, to a rack piston in a feed cylinder. The hydraulic system for controlling the rack piston may be considered, in effect, as two circuits having a common branch, one of said circuits controlling the forward movement of the feed shaft and the other controlling the retraction thereof. The common branch contains the feed cylinder and a reversing valve, the latter operable in one position to direct pressure through one of the circuits and move the rack piston in one direction, and operable in a second position to direct pressure through the other circuit to move the rack piston in the opposite direction.

The feed circuit which controls forward feed movement contains a network of three rate valves and two control valves, the latter having extending plungers for operation of the valves. The rate valves and control valves are so arranged that in any condition of the control valves, flow through the circuit occurs through one, and only one, rate valve, the particular rate valve through which flow occurs depending on the condition of the control valves. In the preferred arrangement, when neither control valve is operated flow occurs through a rapid, or "coarse feed" rate valve; when the first control valve is operated flow occurs through a slow, or "fine feed" rate valve; when the second control valve is operated flow occurs through a very slow, or "extra-fine feed" rate valve. The circuit which controls retraction of the feed shaft contains, in addition to the branch common to both circuits, only a control valve which, in its normal, or unoperated, condition, permits flow therethrough. When the valve is operated, flow is blocked to stop the reverse movement of the piston.

The control valves of both circuits are mounted in a valve block adjacent a cam which is operatively connected to the feed piston for rotation in coordination with movement of the feed shaft, the cam rotating in one direction on forward movement of the feed shaft and rotating in the opposite direction on rearward retracting movement thereof. The rotating cam has three sloping cam portions, each in registration with one of the control valve plungers during the entire feeding cycle, the cam rotating not more than 120 degrees during each cycle. The two sloping cam surfaces in registration with the two plungers of the control valves in the feed circuit which controls forward feeding movement are both inclined to engage said plungers as the cam rotates in one direction during the forward feed portion of the cycle; the sloping cam surface in registration with the plunger of the control valve in the circuit controlling retraction of the feed shaft is inclined in the opposite direction to engage said plunger as the cam rotates in the opposite direction during the retraction of the feed shaft. Each control valve is individually adjustable relative to the cam so that its plunger can be set relative to its sloping cam portion for operation at any selected axial position of the feed shaft. Thus, in a typical cycle, when the reversing valve is set in one position, the wheelhead is initially fed at a coarse feed rate, neither of the control valves in the forward feed circuit being operated. At a selected position of the wheelhead, predetermined by the position of the first control valve relative to the cam, the first control valve is operated to alter the feed movement to a fine feed rate. Thereafter, at a second selected position of the wheelhead, predetermined by the position of the second control valve relative to the cam, the second control valve is operated to alter the feed movement to an extra-fine feed rate. Moreover, the control valves can if desired be positioned either for continuous engagement by the cam or positioned beyond the reach of the cam to eliminate one or more of the feed rates from the cycle.

When the reversing valve is shifted to its other position, reversing the movement of the feed piston and feed shaft, the cam rotates in the opposite direction. At a selected position of the wheelhead, predetermined by the position of the control valve in the circuit controlling the retraction of the feed shaft relative to its cam portion, that control valve will be operated to stop retraction of the feed piston.

With this arrangement any combination of feed rates, for any desired amount of feed travel, can be obtained. Moreover, this infinite variety of feed combinations can be realized without any change, or adjustment, of the cam. It is therefore another object of the present invention to provide an improved control mechanism for feeding movement.

In the preferred form of the invention the center shaft is threadedly received in a nut in the wheelhead and, by relative rotation of the nut and shaft, the wheelhead can be shifted relative to the shaft to alter the zone of movement of the wheelhead. This can be done through a handwheel when it is desired to adjust the wheelhead relative to the shaft; or it can be done automatically after a predetermined number of grinding cycles to compensate for grinding wheel wear. A novel clutch mechanism is provided which normally connects the compensating mechanism to the shaft and nut mechanism on the wheelhead but which is selectively operable to connect the handwheel thereto. It is therefore another object of the present invention to provide an improved mechanism for alternate manual or automatic adjustment of the wheelhead relative to the wheelhead shaft.

It is desirable to provide a positive stop for the feed mechanism to accurately stop forward feeding movement of the wheelhead at the precise position corresponding to the desired finished size of the workpiece. In the preferred form of the present invention this positive stop is at the inner end of a valve bushing which is adjustably located in the end of the feed cylinder to arrest the movement of the piston, and hence the forward axial movement of the feed shaft. The gearing between the feed piston and the feed shaft is such that the piston will move a substantial distance for a relatively limited axial movement of the shaft so that when the valve bushing and positive stop is adjusted in the feed cylinder, any error in adjustment will result in a substantially smaller error of adjustment in the final position of the shaft. The valve bushing receives a valve member operable by a plunger extending beyond the stop surface to signal completion of the forward feeding movement of the wheelhead when engaged by the feed piston. It is therefore another object of the present invention to provide an improved accurate positive stop for the forward feeding movement of the wheelhead.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 8 is a view taken on the line 8—8 of FIG. 6;

FIGS. 9 and 10 are diagrams of the hydraulic system of the present invention;

FIG. 11 is a schematic diagram of the hydraulic control circuitry which controls movement of the feed piston.

The present invention is illustrated in conjunction with a grinding machine of the type described in the U.S. Patent 2,478,607 of Theler and Mehlhope dated August 9, 1949, in which a workpiece is supported for grinding on a pair of spaced shoes and is rotated on the shoes by a rotating driver engaged with one end of the workpiece. However, the present invention, which relates to a mechanism for feeding a grinding wheel relative to a workpiece, can be utilized on any grinding machine in which plunge cut grinding is performed.

Figure 1:
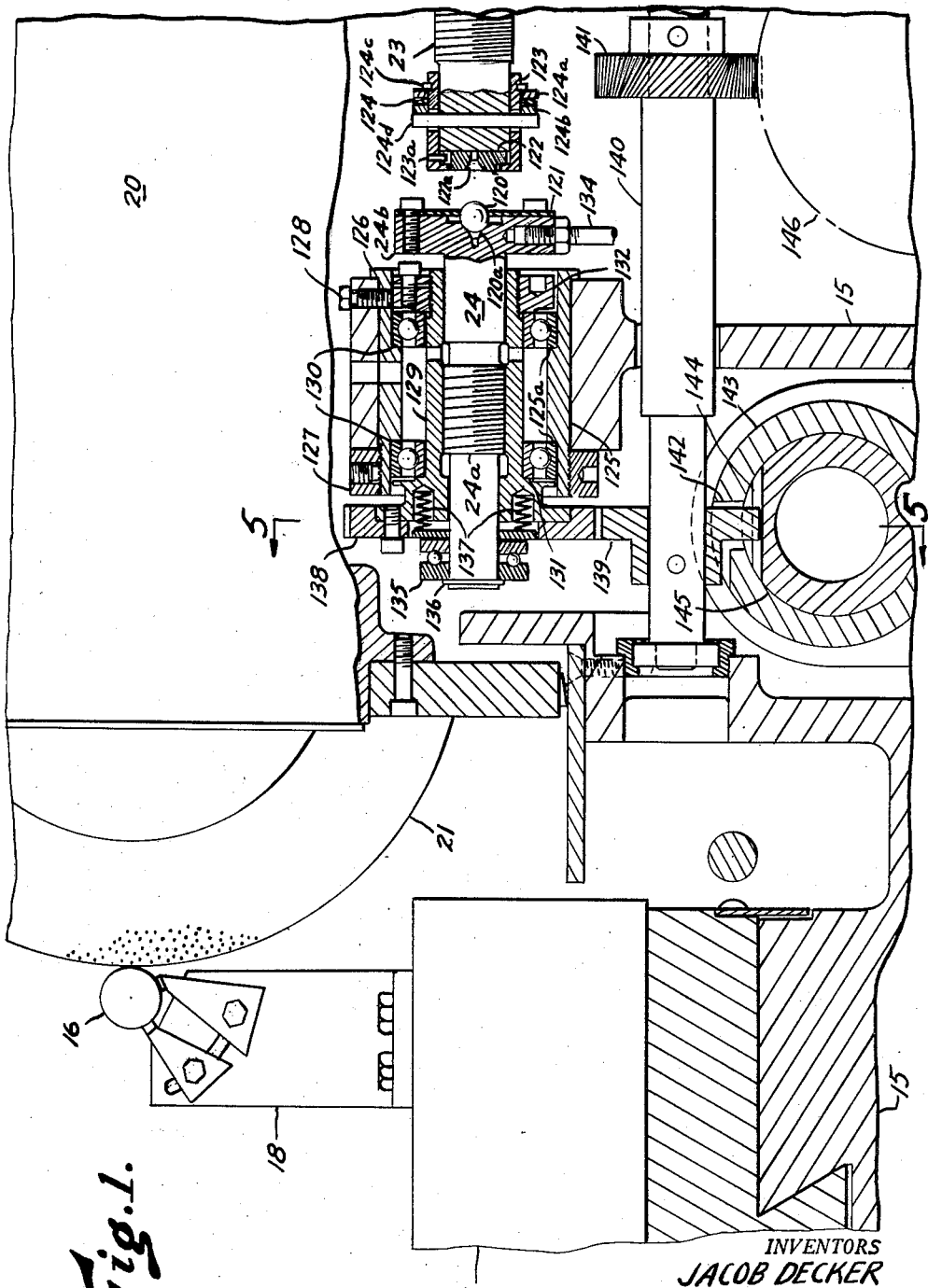
FIG. 1 is a fragmentary view, partly in cross section, of a machine with the feed mechanism of the present invention showing the forward feed shaft and a portion of the center wheelhead shaft.
Figure 2:
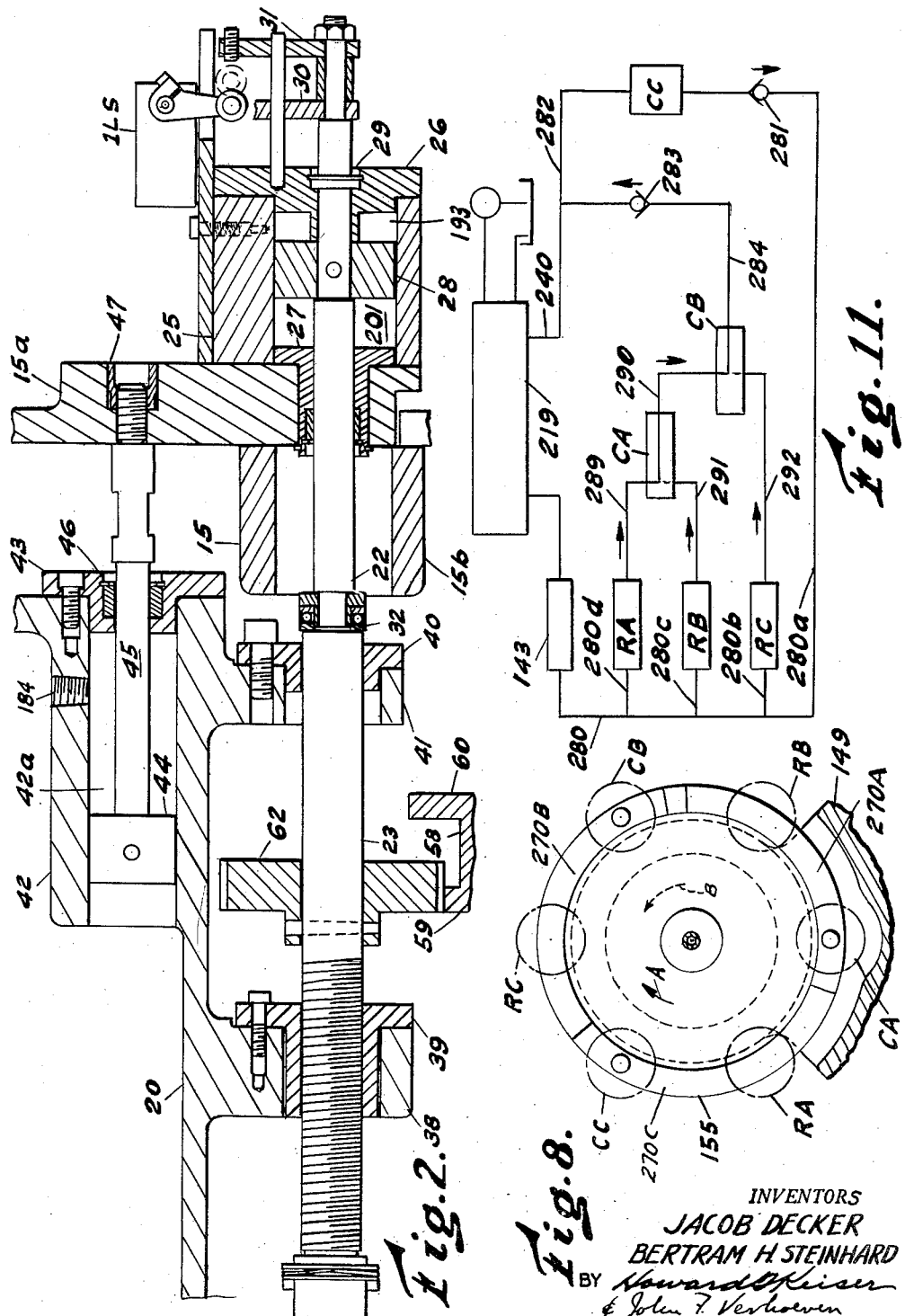
FIG. 2 is a view taken in the same direction as FIG. 1, showing the center wheelhead shaft and the rapid advance shaft.
Figure 4:
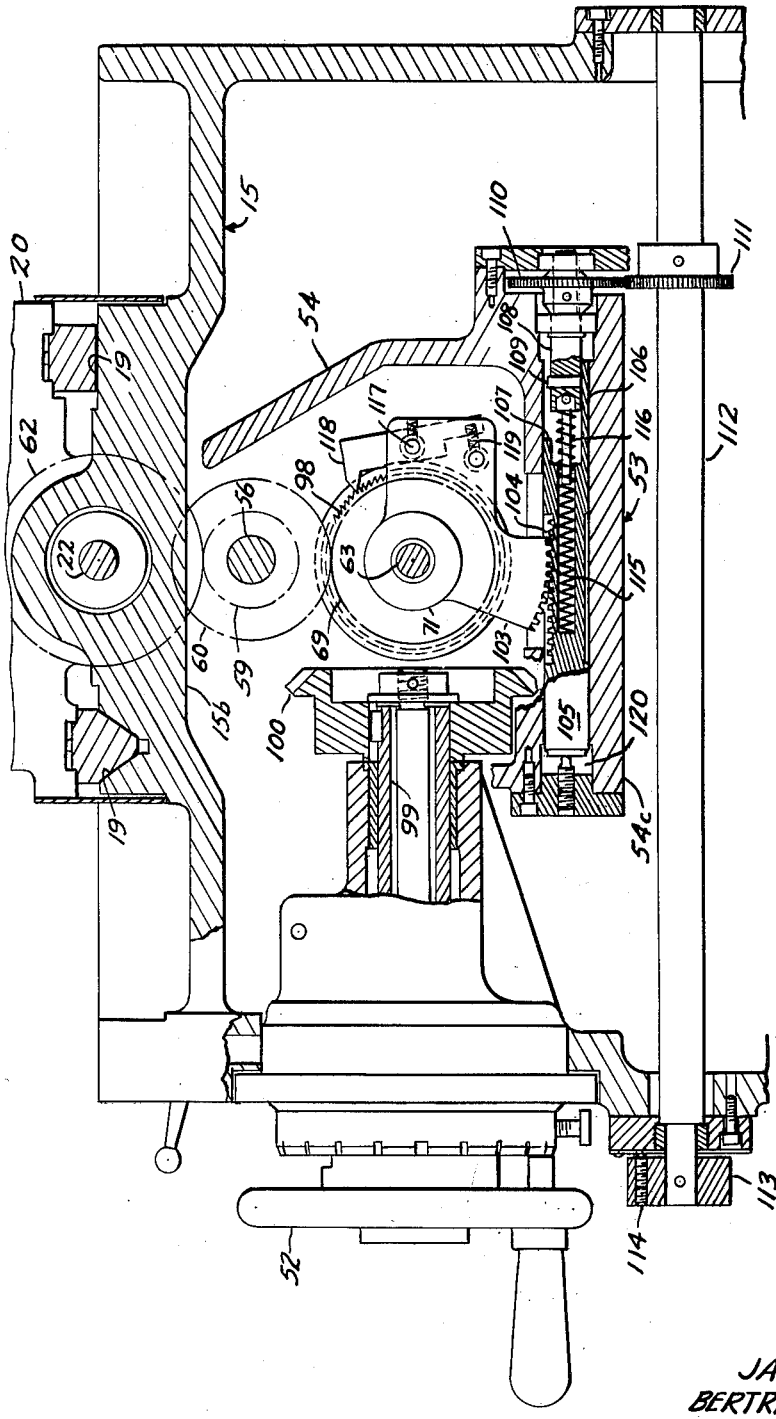
FIG. 4 is a view taken on the line 4—4 of FIG. 3.
Figure 5:
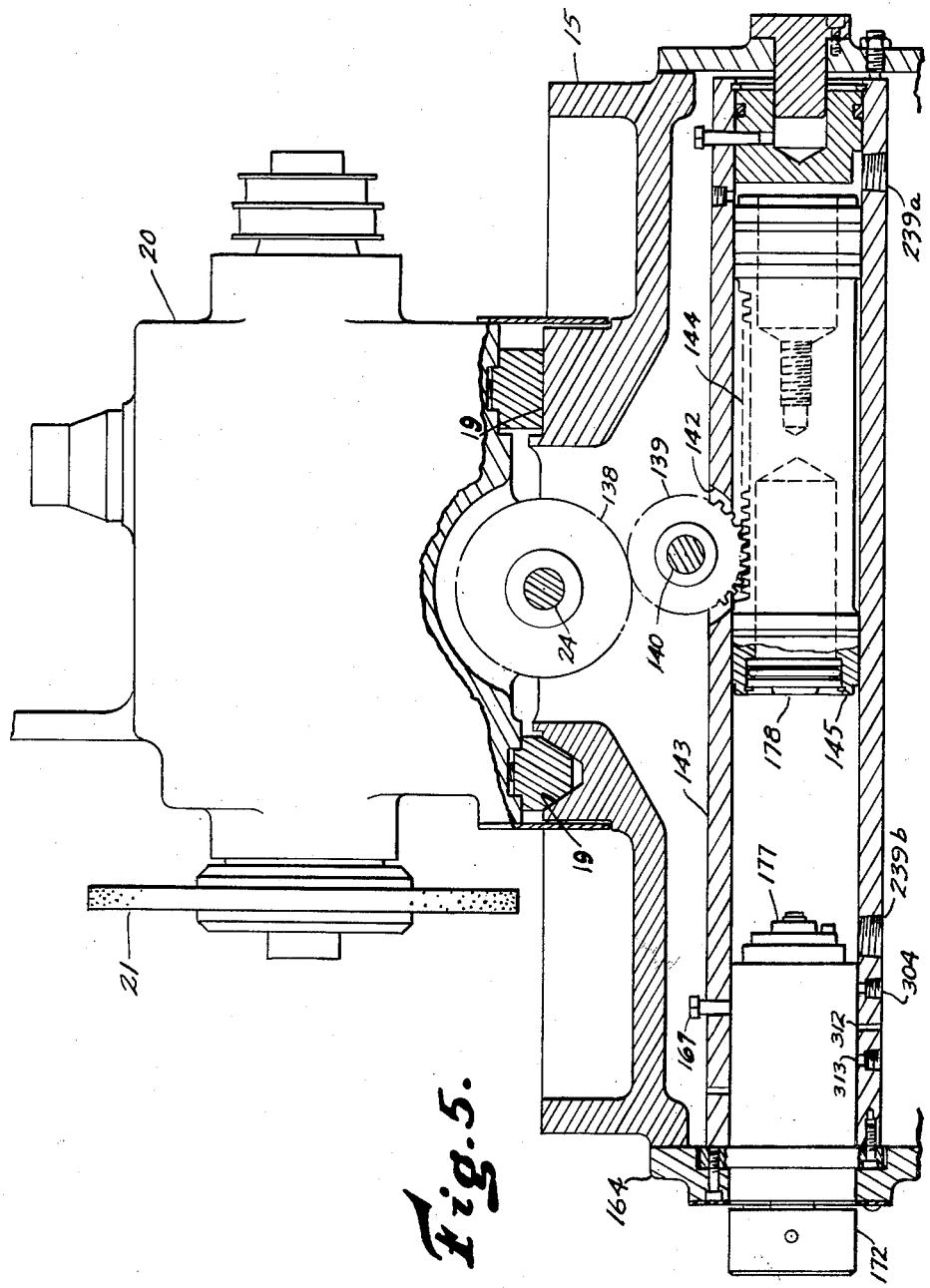
FIG. 5 is a view taken on the line 5—5 of FIG. 1.

As shown in FIG. 1, the machine has a base 15 and means to support a workpiece 16 thereon inluding a table 17 and the supporting bracket 18. As shown in FIGS. 4 and 5, the base 15 has ways 19 and the wheelhead 20 is mounted thereon for movement towards and away from the workpiece supporting means. The wheelhead 20 supports a rotatable grinding wheel 21 which, during the grinding cycle, is moved into and out of grinding engagement with the workpiece 16. Movement is imparted to the wheelhead through three separate aligned shafts: a rapid advance shaft 22 (FIG. 2), a threaded wheelhead shaft 23, and a threaded feed shaft 24 (FIG. 1). As shown in FIG. 2, a plate 15a connected to a portion of the base 15b has connected to the rear face thereof a cylinder block 25 having end plate 26. The rapid advance shaft 22 is slidably received in a bushing 27 mounted in the plate 15a and carries a piston 28 slidably received in cylinder block 25. The shaft 22 extends rearwardly through the end plate 26, which is provided with seal 29, and behind the end plate 26 carries trip arms 30 and 31. The trip arms 30 and 31 are positioned to operate respectively switches 2LS and 1LS mounted on top of the cylinder block 25. On the forward end of shaft 22 is mounted a thrust bearing 32 the forward end of which defines an abutment surface adapted to engage the rear end of the wheelhead shaft 23, which also defines an abutment surface.

The wheelhead 20 has a portion 38 depending between ways 19 into the base in which is mounted a nut 39 which threadedly receives the threaded forward end of the shaft 23. The rear end of shaft 23 is mounted in a bushing 40 mounted in another depending portion 41 of the wheelhead. The wheelhead 20 has an integral cylinder 42 defining a chamber 42a which is closed at the rear end by plate 43. Piston 44 is slidably received in the cylinder chamber and is connected to a piston rod 45 which extends through the end plate 46, which has the seal 46 therein, and the rod 45 is threadedly received in nut 47 mounted in the base plate 15a. Thus, the piston rod and piston are secured in a fixed position relative to the base, and pressure introduced in the cylinder chamber, on the rear side of the piston, constantly urges the wheelhead rearwardly. Since, as will be described hereafter, pressure is so applied throughout the entire cycle the wheelhead shaft 23 is constantly urged against the rapid advance shaft 22, and backlash between the threaded portion of the wheelhead shaft and the nut 39 mounted in the wheelhead is eliminated.

Rotation of the wheelhead shaft 23 will effect a positional change of the wheelhead 20 relative to the shaft 23 and hence will alter the zone of movement of the wheelhead during the cycle. Such a positional change is desired for original adjustment of the wheelhead during setup, to accommodate the particular sized workpieces which are to be cycled continuously through the machine, and this adjustment is effected manually through a handwheel 52 (FIG. 4). A positional change of the wheelhead relative to the shaft is also desired periodically after a predetermined number of grinding cycles to compensate for grinding wheel wear and this adjustment is effected automatically through the compensation mechanism shown generally at 53 (FIG. 4). The shaft 23 is not rotated during the grinding cycle.

Figure 3:
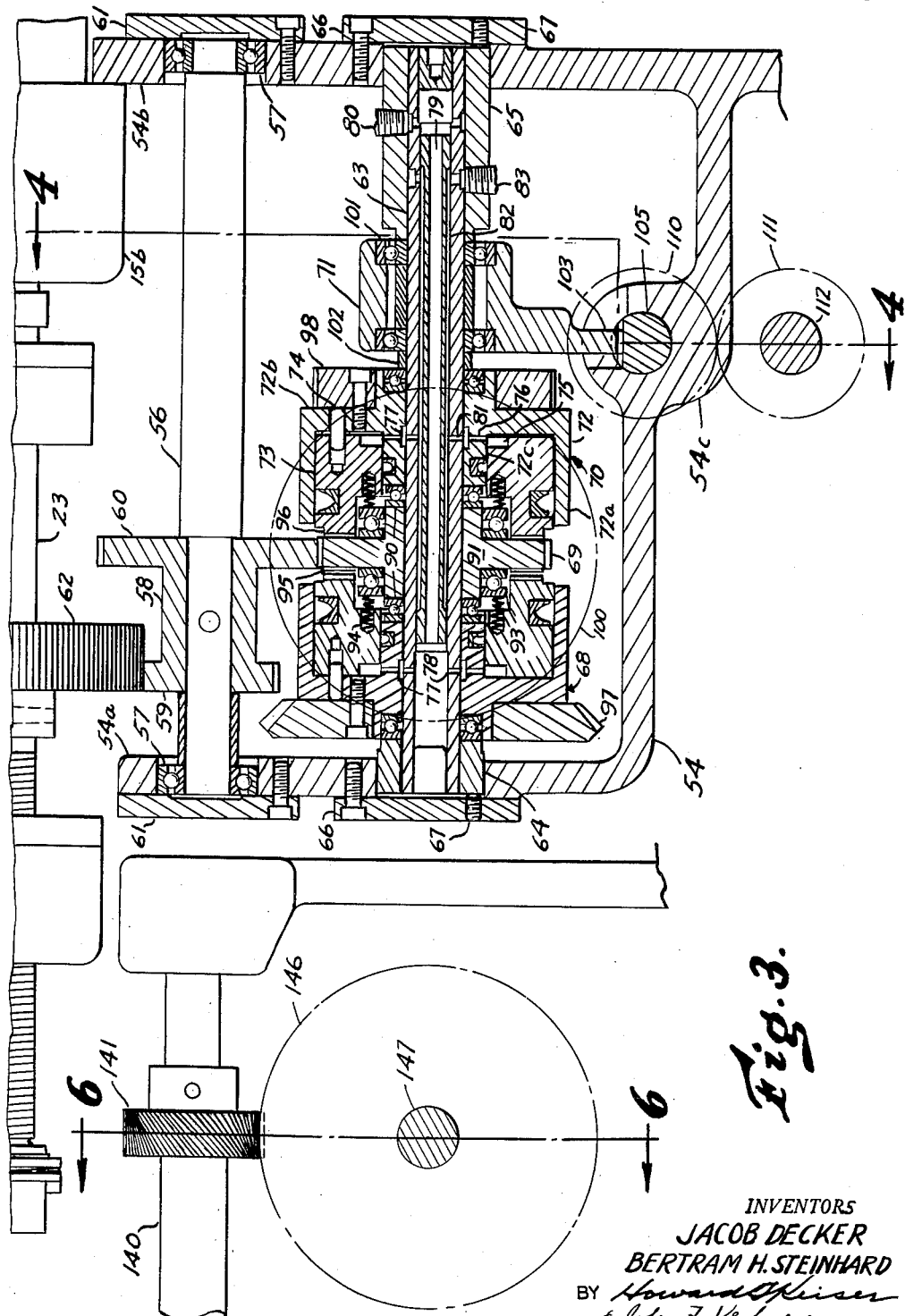
FIG. 3 is a view taken in the same direction of FIGS. 1 and 2, showing the clutch members which are mounted below the wheelhead shaft for selective connection of the handwheel or compensation mechanism to said shaft.

As shown in FIG. 3, within the base is mounted a housing 54 (FIGS. 3 and 4) having end walls 54a and 54b (FIG. 3). A shaft 56, the two ends of which are mounted in ball bearings 57 in the walls 54a and 54b, has pinned thereto a sleeve 58 having integral spaced gears 59 and 60. End caps 61 secure the bearings 57 in the walls. The forward gear 59 is engaged with a wide spur gear 62 pinned to the wheelhead shaft 23 and remains engaged therewith during the entire grinding cycle as the wheelhead shaft 23 is axially shifted to feed the wheelhead relative to the workpiece. Another shaft 63 has its ends snugly received in sleeves 64 and 65 which in turn are snugly received in openings in the walls 54a and 54b. Caps 66 are secured to the outer surfaces of the walls and have set screws 67 for axial adjustment of the sleeves 64 and 65 and hence the shaft 63. Mounted on the shaft 63 between the sleeves 64 and 65 is a clutch mechanism shown generally at 68, a gear 69 engaged with gear 60 on shaft 56, a clutch mechanism shown generally at 70, and an actuator 71.

Each of the clutch mechanisms 68 and 70 comprise a cup-shaped cylinder 72 having an outer circular wall 72a, a base 72b, and a central hub portion 72c, the hub portion 72c being rotatably received on the shaft 63. Between the outer wall 72a and the hub 72c is received an annular piston 73 which is shiftable axially relative to the cup shaped cylinder 72 but which is connected to the base thereof by pins 74 for rotation therewith. A recess in the piston adjacent the base 72b defines a chamber 75 connected by passage 76 through the hub portion to the annular groove 77 in communication with shaft 63. The groove 77 of clutch member 68 is connected by passage 78 to a central passage 79 of the shaft 63 to port 80, and the groove 77 of clutch mechanism 70 is connected by passage 81 to the annular passage 82 of shaft 63 to port 83. Between the hub portions 72c of the clutch mechanisms 68 and 70, and separated therefrom by thrust bearings 90, is a sleeve 91 which is integral with the spur gear 69 engaged with gear 60. The sleeve 91, which is rotatable on shaft 63, has a pair of thrust bearings 93 thereon each of which is engaged by springs 94 received in the annular pistons 73 of the clutch mechanisms. The gear 69 has teeth 95 on each face thereof adapted to engage with teeth 96 on the face of the pistons 73 when one or the other of said pistons is shifted toward the gear 69. In the absence of pressure in the chambers 75 the springs 94 serve to disengage the respective clutch mechanisms from the gear 69. Connected to the cup-shaped cylinder 72 of clutch mechanism 68, for rotation therewith, is a bevel gear 97, and connected to cup member 72 of clutch mechanism 70, for rotation therewith, is a ratchet gear 98.

As shown in FIG. 4, handwheel 52 is operatively connected to a sleeve 99 which is rotatably supported in the base 15 of the machine and has keyed thereto a bevel gear 100. This gear is engaged with the bevel gear 97 and when the piston 73 of clutch mechanism 68 is advanced to engage gear 69, and piston 73 of clutch mechanism 70 is retracted, the wheelhead shaft 23 can be rotated through bevel gears 100 and 97, clutch mechanism 68, gear 69, double gears 60 and 59, and gear 62 on the shaft 23.

For automatic compensation the actuator 71, which is rotatably mounted on bearings 101 on the shaft 63 and which is spaced from the clutch mechanism 70 by spacer 102, periodically rotates ratchet wheel 98. As shown in FIGS. 3 and 4, the actuator 71 has an arcuate toothed portion 103 which is engaged with a rack 104 on piston 105 carried in the lower wall 54c of housing 54. Piston 105 terminates in a skirt portion 106, the end of which defines a plurality of circumferentially spaced steps 107. Journaled in the base at the skirt end of piston 105 is a shaft 108 with a pin 109 extending from one side thereof. The skirt portion of piston 105 slides over the shaft 108 when the piston is shifted axially and is arrested when one of the steps 107 engage pin 109. Rotation of shaft 108 to selected angular positions will provide a selected travel of piston 105 to provide the desired amount of compensation for wear of the grinding wheel 21. Shaft 108 has a gear 110 pinned thereto which engages a gear 111 carried on a shaft 112 journaled in the base and extending through the base for adjustment by knob 113 pinned to the shaft 112. The shaft 108, and hence the pin 109 thereof, can be locked in a selected angular position by set screw 114 of knob 113. A spring 115, having one end received in piston 105 and the opposite end received on a stud 116 which is received in the end of shaft 108, urges the piston 105 to the left hand position. The actuator 71 has pivotally connected thereto at 117 a pawl 118 which is urged into engagement with ratchet wheel 98 by spring 119. When piston 105 is shifted to the right by pressure introduced to chamber 120 the actuator 71 is rotated in a counterclockwise direction, as viewed in FIG. 4, to rotate the ratchet wheel 98. When pressure in chamber 120 is released, and the piston is returned to its left-hand position by spring 115, the actuator is rotated in a clockwise direction, riding over the teeth on ratchet wheel 98 without rotating that wheel. Thus, on introduction of pressure to chamber 120, selected automatic compensation of the wheelhead relative to the wheelhead screw 23 is achieved when the clutch mechanism 70 is engaged with gear 69, and the clutch mechanism 68 disengaged therefrom, the compensation occurring through actuator 71, clutch mechanism 70, gear 69, double gears 60 and 59, and gear 62 carried on the shaft 23.

During a grinding cycle the wheelhead shaft 23 is constantly urged rearwardly, into contact with shaft 22 by virtue of the cylinder 42 and piston 44 connected between the wheelhead and base, but, to advance the wheelhead, the shaft 22 is actuated to overcome the force exerted by the cylinder 42 and piston 44 and thereby shift the shaft 23 forwardly into contact with feed shaft 24. The forward feeding movement of shaft 23, and hence the wheelhead, is effected by controlled forward feeding movement of feed shaft 24 which permits controlled forward movement of shaft 23 by the force applied thereto by shaft 22. To achieve the controlled feed movement of shaft 24, a sleeve 125, as shown in FIG. 1, is mounted in the base and secured therein by a flange 126 on one end of the sleeve, a collar 127 screwed on the opposite end of the sleeve, and a pin 128 in the base engaged with the sleeve to prevent rotation thereof. A nut 129 is rotatably mounted in the sleeve by bearings 130 and has a shoulder 131 at one end and a collar 132 at the oppositie end to hold the bearings against shoulders 125a on the sleeve. The nut 129 receives shaft 24 which has a threaded portion 24a engaged with the nut, the shaft being held against rotation by rod 134 which is secured to the base. At one end the shaft has a thrust bearing 135 held thereon by lock ring 136 and the thrust bearing, and hence shaft 24, and nut 129 are urged in opposite directions by springs 137 interposed therebetween to eliminate backlash between the nut and the shaft.

As shown in FIG. 1, the feed shaft 24, which does not rotate during the feed cycle, has a ball 120' held in a seat 120a in an end flange 24b of shaft 24 by a plate 121 connected to the end of the flange and having an opening through which the ball protrudes. The shaft 23 has, on its forward face, a radially shiftable member 122 defining a conical seat 122a to receive the ball as shaft 23 is urged forwardly. The member 122 is firmly but slidably held against the forward end of shaft 23 by a cap 123 received on shaft 23 and extending over member 122, the cap being urged rearwardly on shaft 23 by an annular spring member 124 sandwiched between rings 124a and 124b engaged, respectively, with a lock ring 124c on the cap and a pin 124d secured in the shaft. A slot in member 122 receives a radial pin 123a on cap member 123 to prevent rotation of member 122 on shaft 23. Thus as shaft 23 is urged forwardly into engagement with feed shaft 24, the seat 122a which defines an abutment surface on shaft 23 will engage ball 120' which defines an abutment surface on shaft 24 and will be shifted radially thereby to receive the ball if there is any misalignment between shafts 23 and 24, without lateral deflection of shaft 23 or 24.

Figure 6:
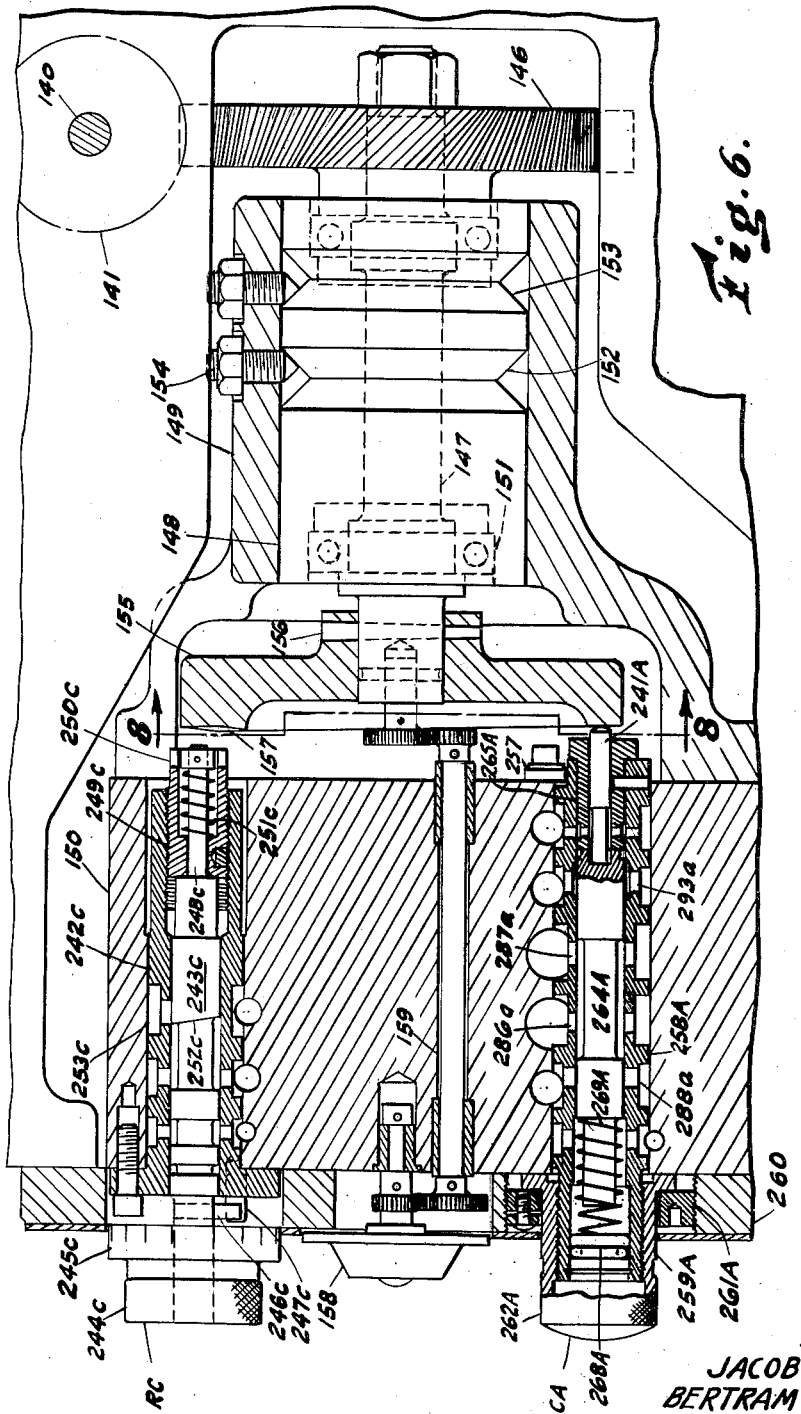
FIG. 6 is a view taken on the line 6—6 of FIG. 3.

As shown in FIGS. 1 and 5, the nut 129 is rotated relative to the shaft through a gear 138 connected to the nut and engaged with a gear 139. The gear 139 is pinned to a shaft 140 journaled in the base, the shaft 140 also having the helical gear 141 pinned thereto. The gear 139 extends through a slot 142 in feed cylinder 143 mounted in the base and engages the rack 144 of rack piston 145 slidably received in the cylinder. The helical gear 141 is engaged with a helical gear 146 which is mounted on one end of shaft 147. As shown in FIG. 6, sleeve 148 is mounted in a housing 149 which is connected to valve block 150 and the shaft 147 is mounted in bearings 151 in the sleeve 148. The sleeve has a pair of oppositely inclined bevel surfaces 152 and 153 which engage pointed screws 154 for precise axial positioning of the sleeve and hence the shaft 147. At the opposite end of the shaft 147 a cam 155 is pinned at 156 to the shaft, the cam member 155 having an annular end cam surface 157 adapted to engage rearwardly extending plungers of control valve members mounted in the valve block 150. Thus it will be seen that rotation of cam 155, which is operatively connected to the feed piston 145, and the gear 138 connected to nut 129, through gear 139, shaft 140, gear 141, gear 146, and shaft 147, is coordinated with movement of the feed shaft 24, and hence the wheelhead and grinding wheel. Dial 158, which is connected to the cam member 155 by a gear train designated generally at 159, gives the operator visual indication of the movement of the wheelhead.

The extreme forward position of the grinding wheel relative to the workpiece is precisely determined by a positive stop in the feed cylinder which arrests the movement of the feed piston. Since the movement of the piston is quite large compared to the movement of the wheelhead, because of the gear train and nut therebetween, extremely accurate positioning of the wheelhead can be effected by adjustment of the stop mechanism. In an actual construction the movement of the feed piston was over five inches to effect .050 inch of movement of the wheelhead so that any error in the adjustment of the feed piston stop mechanism will cause only an insignificant error in the final forward positioning of the wheelhead. The stop mechanism, indicated generally at 165, is shown best in FIG. 7. A flange of sleeve 166 is bolted to plate 164 connected to base 15 and the sleeve is snugly received in the end of the feed cylinder 143, relative rotation between sleeve 166 and cylinder 143 being prevented by pin 167. Snugly received in one end of the sleeve 166, and pinned therein at 168, is a nut 169. A shaft 170 having a threaded portion 171 is received in the nut 169 and has a knob 172, pinned at one end, and a valve bushing 173 secured to a flange 174 thereof on the opposite end. At the inner end the valve bushing 173 receives a sleeve 175 which is clamped therein by collar 176 secured to the end of the valve bushing. The sleeve 175 extends beyond the valve bushing and collar, and has a stop surface 177 in registration with a terminal surface 178 on the piston. By rotation of the knob 172 the stop surface 177 of the valve bushing is axially adjusted relative to the piston to terminate the travel of the piston, and hence the forward feed of the grinding wheel, at a selected position.

Figure 10:
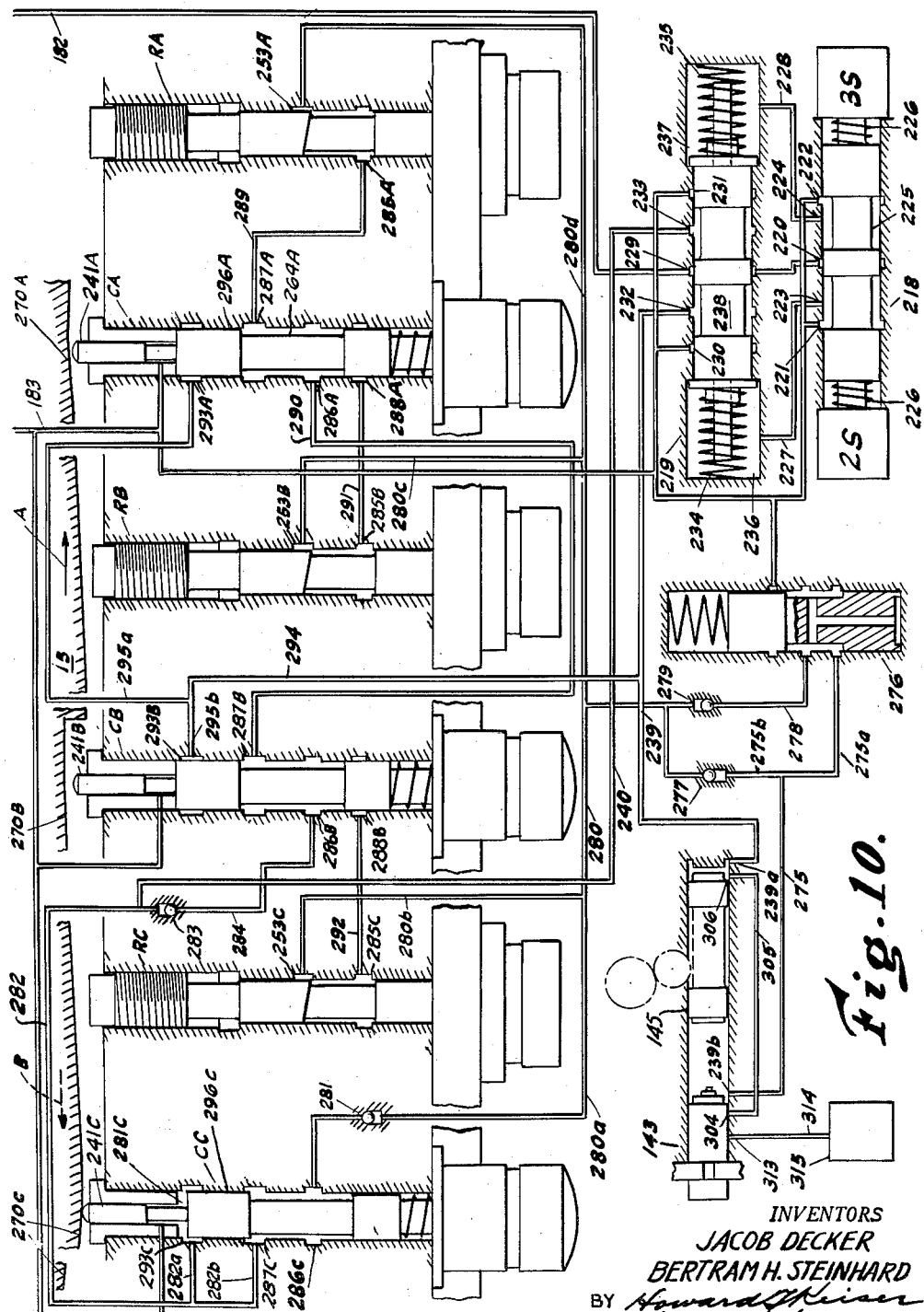

As shown in FIGS. 9 and 10, in the hydraulic system of the present invention, a pump 179 supplies fluid under pressure from a sump 181 to a pressure line 182, the relief valve 180 connected between sump 181 and line 182 determining the pressure in that line. A discharge line 183 returns fluid to the sump. The pressure line 182 is connected to the annular groove 206b in valve 206, between groove 206b and annular groove 185 in valve 186, and between groove 185 and port 184 of cylinder 42 so that pressure is continuously supplied to chamber 42a on one side of the piston 44, pressure being transmitted through the grooves 206b and 185 regardless of the position of the valve members. This continuously urges shaft 23 against shaft 22 so that the wheelhead is fully retracted when the shaft 22 is retracted, and the backlash between the threaded portion of the shaft 23 and the nut in the wheelhead is constantly taken up. When the solenoid 1S of valve 186 is energized, and the valve member 187 is shifted to the left of the position shown in FIG. 9, the pressure groove 185 is connected, through the valve, to motor port 188. Motor port 188 is connected to line 189 which has branches 190 and 191 connected to port 192 adjacent the right end of the rapid approach cylinder, defined by the block 25, and communicating with chamber 193 therein. The line 189 also has a branch 194 connected to port 195 of the rapid approach cylinder, which port is spaced from the port 192. With solenoid 1S energized pressure is supplied from line 189 through branches 190 and 191 to the port 192 and chamber 193. The port 196 of the rapid approach cylinder is adjacent the left end thereof and connects to branch lines 197 and 198 which, in turn, are connected to the discharge line 183. The discharge line 183 is connected to a port 200 spaced from the left end port 196. Since the effective area of rapid approach piston 28 is larger than the effective area of piston 44, the piston 28 is moved to the left when pressure is supplied to chamber 193. Discharge from the chamber 201 at the left end of the rapid approach cylinder occurs initially through port 200 directly to return line 183 but, when the port 200 is covered, discharge is restricted to the branch line 197 which contains a restriction 202 therein, thereby slowing the piston as it approaches the forward limit of its travel. When solenoid 1S is deenergized and the valve member 187 is returned by spring 203 to the position shown, the motor port 188 is connected to discharge port 204 of the valve, which is connected to the discharge line 183 and thus, both chambers of the rapid approach cylinder are connected to discharge. Under these circumstances the piston 28 is moved to the right by the piston 44 acting through shaft 23 which abuts against the shaft 22. As the port 195 is covered the piston is decelerated since discharge from chamber 193 is limited to the branch line 191 which contains the restriction 205.

When the solenoid 5S of the solenoid operated valve 206 is deenergized, and the valve member 206a is held in the position shown in FIG. 9 by spring 207, pressure groove 206b is connected, through the valve, to port 206c thereof. This port is connected to chamber 75 of clutch mechanism 70 through line 208 to engage clutch mechanism 70 and connect the wheelhead shaft 23 with the compensation piston 105. Chamber 75 of clutch mechanism 68 is connected to port 206d of valve 206 through line 209. With valve member 206a in the position shown, port 206d is connected to discharge port 206e and hence the clutch mechanism 68 is disengaged. When valve member 206a is shifted to the left on energization of solenoid 5S, port 206c is connected to discharge port 206f and port 206d is connected to pressure groove 206b, thereby disengaging clutch mechanism 70 and engaging clutch mechanism 68 to connect the wheelhead shaft 23 to the handwheel 52.

The cylinder of the compensation mechanism 53 has ports at each end, the right-hand port 210 being connected to the discharge line 183 and the left-hand port 211 being connected by line 212 to motor port 213 of the solenoid operated compensation valve 214. When solenoid 6S of that valve is energized, the valve member 214a is shifted to the left of the position shown and pressure groove 215, which is connected to the pressure line 182, is connected through the valve to motor port 213 and the compensation piston 105 is shifted to the right. When solenoid 6S is deenergized, and the valve member 214a is shifted to the position shown by spring 216 of the valve, the motor port 213 is connected to discharge port 217 of the valve, which is connected to the discharge line 183, and both sides of piston 105 are then connected to discharge, the piston being shifted to the left by the spring 115.

The forward feeding movement of the feed shaft 24, and the retraction thereof, is controlled by the pilot valve 218 and the reversing valve 219. The pilot valve has a pressure port 220 which is connected continuously to the pressure line 182 through pressure groove 229 of valve 219, a pair of discharge ports 221 and 222 which are connected to the discharge line 183, and a pair of motor ports 223 and 224. The valve 218 has the solenoids 2S and 3S at each end and, when both solenoids are deenergized, the valve member 225 is centered by the springs 226. When the solenoid 2S is energized, and the solenoid 3S deenergized, the valve member 225 is shifted to the right and the pressure port 220 is connected through the valve to the motor port 223, and the line 227 connected thereto. When the solenoid 3S is energized, and the solenoid 2S deenergized, the valve member 225 is shifted to the left and pressure is supplied through port 220 to the port 224, and the line 228 connected thereto. The reversing valve 219 has, on either side of the pressure groove 229 which is connected to the pressure line 182, a pair of discharge ports 230 and 231 connected to the discharge line 183, and a pair of motor ports 232 and 233. The valve 219, which is normally centered by springs 234 and 235, has terminal chambers 236 and 237 and is shifted in response to the pressure conditions in said chambers. When solenoid 2S of the pilot valve 218 is energized the chamber 236 is connected to pressure and the chamber 237 is connected to exhaust so the valve member 238 is shifted to the right, and the pressure port 229 is connected to port 232 to supply pressure to the line 239 connected thereto. When the solenoid 3S of the pilot valve is energized the pressure conditions in the chambers 236 and 237 are reversed and the valve member 238 is shifted to the left, connecting the motor port 233 to the pressure port 229 and supplying pressure to line 240 connected thereto.

The circuitry which controls the movement of the feed piston 145, and hence the feeding movement and retraction of the feed shaft 24, contains a plurality of control valves and rate valves which are mounted in the valve block 150. As shown best in FIG. 8, the valves are disposed in circular array about the axis of the shaft 147 which carries the cam member 155, and are parallel to that axis. The control valves CA, CB and CC have plungers 241A, 241B and 241C, respectively, extending rearwardly from the control valve members and in registration with the cam surface 157. The rate valves and the control valves are alternately arranged so that each control valve is 120° from each of the other control valves. All of the rate valves are similar and therefore only the rate valve RC will be described. As shown in FIGS. 6 and 10, the valve RC has a valve bushing 242C secured in the valve block 150 which receives a rotatable valve member 243C to which is connected a knob 244C with an indexed dial 245C. The valve member 243C has a pin 246C extending therefrom which engages a pin 247C in the valve bushing to define the normal limits of rotation of the valve member. The valve member has a rearwardly extending stud 248C which extends through a sleeve 249C threadedly received in the valve bushing, the stud having a collar 250C pinned at its end. A spring 251C on the stud, which engages the sleeve and collar, urges the valve member against the sleeve 249C to fix the normal position of the valve member axially in the valve bushing. The valve member 243C has a spool with an inclined shoulder 252C positioned relative to one of the ports 253C so that on rotation of the valve member the port opening can be varied to control the flow through said port.

The control valve CA has a valve bushing 258A which is slidably received in the valve block 150 and which has a threaded portion at the forward end threadedly received in a sleeve 259A. The sleeve is rotatably held in a plate 260 of the valve block 150 by a collar 261A threadedly received in said plate. The sleeve terminates in a knob 262A outside the valve block 150 which can be rotated to selectively position the valve bushing 258A axially in the valve block 150, the bushing 258A being held against rotation by lug 257 connected to the rear face of block 150 and received in a slot in the bushing 258A. The valve bushing 258A slidably receives a valve member 264A. The valve CA has a sleeve 265A pinned in the bushing 258A which slidably receives the plunger 241A, the plunger extending beyond the ends of the sleeve, the outer end thereof in registration with the cam surface 157. At the opposite end the valve bushing has a plug 268A and a spring 269A is interposed between the plug and the valve member 264A to normally urged that member against the sleeve 265A and plunger 241A and hold the plunger 241A in its extended position.

The cam member 155 is operatively connected to the feed piston, as is the feed shaft 24 and hence the wheelhead, and therefore, the cam member rotates, in coordination with the movement of the wheelhead, rotating in one direction as the wheelhead advances (shown by the solid arrow A in FIGS. 8 and 10) and rotating in the opposite direction as the wheelhead retracts (shown by the dotted arrows B in FIGS. 8 and 10). The full movement of the feed piston rotates the cam member less than 120° and the cam surface 157 has three sloping cam portions, each of which is constantly in registration with one of the control valve plungers. Two of said sloping cam portions 270A and 270B slope in one direction for engagement and progressive depression of the plungers 241A and 241B, respectively, as the cam member is rotated during feeding toward the workpiece, and the other cam portion 270C is oppositely sloping and therefore adapted to engage its associated plunger 241C, and progressively depress said plunger as the cam member rotates during retraction of the feed shaft 24. When the feed shaft is in its retracted position the cam surfaces 270A, 270B, and 270C are in the positions shown in FIGS. 8 and 10, with plunger 241C of valve CC depressed, plunger 241A spaced from cam surface 270A, and plunger 241B spaced from cam surface 270B a greater distance than plunger 241A is spaced from surface 270A.

When the solenoid 2S is energized, and the valve member 238 of valve 219 shifted to the right, pressure is supplied to line 239 which is connected to port 239a at the right end of the feed cylinder 143. Line 240 is connected to exhaust. Discharge from the port 239b at the left end of the cylinder occurs through line 275 which has a branch 275a containing the pressure reducing valve 276 and a branch 275b containing the check valve 277 which blocks the flow through branch 275b at this time. Discharge from line 275 occurs, at this time, through branch 275a, valve 276, line 278 connected to the valve 276, and check valve 279 in line 278 to the line 280. Line 280 has branch lines 280a leading to control valve CC through which flow is blocked at this time by check valve 281 in that branch line. Line 280 also has branch lines 280b, 280c, and 280d leading, respectively, to rate valves RC, RB, and RA. During the advance of the feed shaft 24 the port 293C of upper chamber 281C of valve CC is connected to exhaust through branch line 282a, line 282, line 240, and reversing valve 219. The three inlet ports 253A, 253B, and 253C of the rate valves RA, RB, and RC are connected to branch lines 280d, 280c, and 280b, respectively, and each of the rate valves has an outlet port 285A, 285B and 285C, respectively. Each of the control valves CA, CB, and CC has a port 286A, 286B, and 286C which is connected to a port 287A, 287B, and 287C when the valves are unoperated. When control valves CA and CB are operated ports 286A and 286B are connected respectively, to a port 288A, 288B. During initial rotation of the cam 155 in the direction of arrow A, discharge in line 280 flows through line 280d, through rate valve RA to line 289, through control valve CA to line 290, and through control valve CB to line 284 which is connected to the port 286B of that valve. The line 284 has check valve 283 and is connected to line 240 which is connected to discharge through the reversing valve 219. With both of the control valves CA and CB unoperated the ports 288A and 288B, which are connected, respectively, to rate valve RB by line 291 and RC by line 292, are blocked and therefore no flow can occur through the rate valves RB and RC. Consequently, during the initial forward movement of the feed shaft the rate thereof is determined solely by rate valve RA, which is adjusted to produce a relatively fast, or "coarse," feed rate.

After a predtermined amount of travel of the feed piston 145 and the wheelhead, the cam portion 270A will depress the plunger of control valve CA, the amount of travel at the "coarse" feed rate being determined by the axial adjustment of the control valve CA. The control valves CA and CB have ports 293A and 293B both of which are connected to line 239, which at this time contains pressure, through lines 294 and lines 295a and 295b, respectively. When the spool 296A is depressed below the port 293A, the valve member 264A fires to a position where the port 286A is connected to port 288A and the port 287A is blocked. Therefore, flow through the rate valve RA is stopped and flow commences through the branch line 280C, through the rate valve RB, through line 291, through control valve CA, through line 290, through control valve CB to line 284, and through line 240 to the reversing valve and discharge. Since control valve CB is still unoperated no flow occurs through rate valve RC. Thus, the rate valve RB alone controls the feed rate of the feed piston, and is adjusted to produce a slower, or "fine," forward feeding movement of the feed shaft 24 and hence the wheelhead.

The feed will continue at the rate established by the rate valve RB until the control valve CB is operated as was the valve CA. When valve CB is operated the port 287B thereof is blocked and consequently flow through the rate valve RB, the line 291, the control valve CA, and the line 290 is blocked. Instead, flow from the line 280 occurs through the branch line 280b, through inlet port 253C of the rate valve RC, through the valve to port 285C thereof, through line 292, through the control valve CB, to the line 284, line 240, through the reversing valve to discharge. At this time therefore flow occurs solely through the rate valve RC, which is adjusted to produce a slower, or "extra-fine feed" rate. Thus it will be seen that the forward movement of the feed shaft is controlled through a circuit containing a branch including the feed piston and reverse valve, and a network including the rate valves RA, RB, RC and the control valves CA and CB, as shown schematically in FIG. 11.

When solenoid 2S is released and solenoid 3S energized pressure is supplied to chamber 237 of the reverse valve 219 and chamber 236 thereof is connected to exhaust so that valve member 238 is shifted to the left and the pressure port 229 of the valve is connected to motor port 233. Thus, pressure is introduced to line 240 and to line 282 connected thereto. The control valve CC is unoperated at this time since the cam surface 270C became disengaged from the plunger 241C during the forward feed movement, and consequently the port 293C of the valve, which is connected to line 282 by the line 282a, is blocked. However, pressure flows through the valve from the port 287C, which is connected to line 282 by a branch line 282b, to the port 286C. This port is connected to the branch line 280a and therefore pressure is transmitted to port 239b at the left end of feed cylinder 143 through lines 280, 275b, and 275. Discharge from the right end of the feed cylinder occurs through port 239a, line 239, and the reversing valve to the discharge line 183. Thus, the feed piston is moved rapidly to the right until the plunger of control valve CC again engages the cam portion 270C at which time the spool 296C is depressed below the port 293C and pressure is introduced to chamber 281C, firing the valve to block the port 287C. This terminates the retraction movement of the feed piston. Thus it will be seen that the reverse movement of the feed shaft is controlled through a circuit having a branch including the feed piston and reverse valve, which is common to the circuit controlling the forward feed movement, and the control valve CC, as shown schematically in FIG. 11, the axial positioning of the valve CC relative to the cam surface 270C determining the retracted position of the feed shaft 24.

Figure 7:
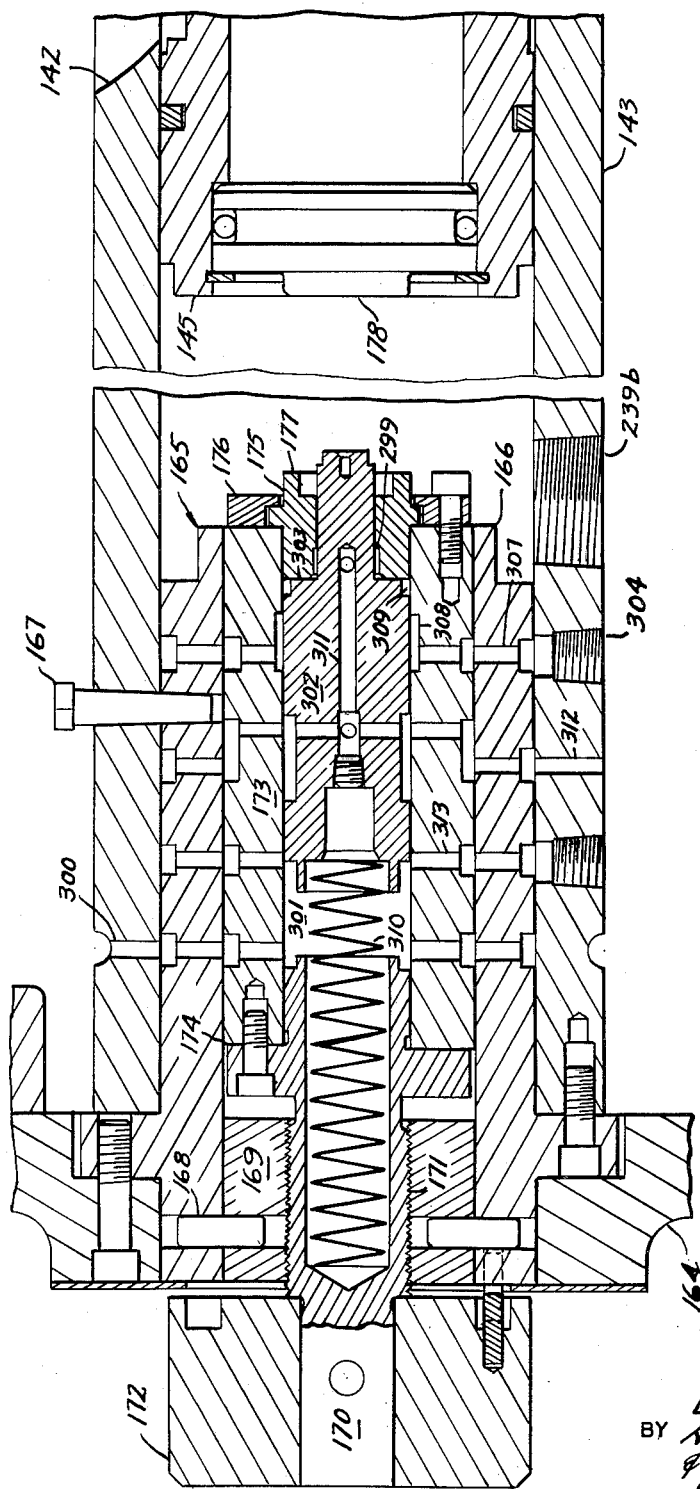
FIG. 7 is an enlarged view of the end of the feed cylinder showing the adjustable valve bushing and stop surface mounted therein.

The operation of the pilot valve 218 and reversing valve 219 when the feed piston terminates its forward feeding movement is accomplished, as shown in FIG. 7, by a valve member 302 slidably received in the valve bushing 173 and having one end defining a plunger extending therefrom through sleeve 175 and beyond the stop surface 177 thereof. The valve member has a shoulder 303 which engages the sleeve 175 when the valve member is in the fully extended position. The end of the valve plunger 302 is engaged by the terminal surface 178 on the piston as the piston approaches the stop surface 177 and the valve member is moved to the left from the position shown by the piston, the chamber 301 at the left end of valve member 302 being connected to exhaust by passage 300. The feed cylinder has a port 304 connected by line 305 to the port 306 at the right end of the cylinder which is in communication with the port 239a at the right end of the cylinder when the feed piston begins its forward feeding movement. The port 304 is connected by a passage 307 through the sleeve 166 and valve bushing 173 to an internal groove 308 on the valve bushing. When the valve member 302 is pushed to the left to uncover this groove, pressure is introduced to the right end of the valve member and the member is fired to the left against the spring 310 which is interposed between the valve member 302 and the shaft 170. The valve member 302 has an internal passage 311 in communication with the chamber 309 formed as the valve member is moved to the left. The internal passage 311 is connected to a discharge passage 312 extending through the bushing, sleeve, and cylinder when the valve member 302 is in the right-hand position, but becomes disconnected therefrom when the valve member 302 is shifted to the left by the piston 145. After the valve member 302 has been fired against shaft 170 passage 311 connects chamber 309 to passage 313. The passage 313 is connected by line 314 to a pressure switch 315. Therefore, after the valve member 302 has fired to the left, pressure is supplied to the pressure switch and the switch is thereby operated. After pressure is released from the right end of the feed cylinder, and piston 145 begins its movement to the right, the valve member 302 returns to the position shown in FIG. 7, fluid in chamber 309 exhausting initially through passage 307 and finally through groove 299, passage 311, and passage 312.

Figure 12:
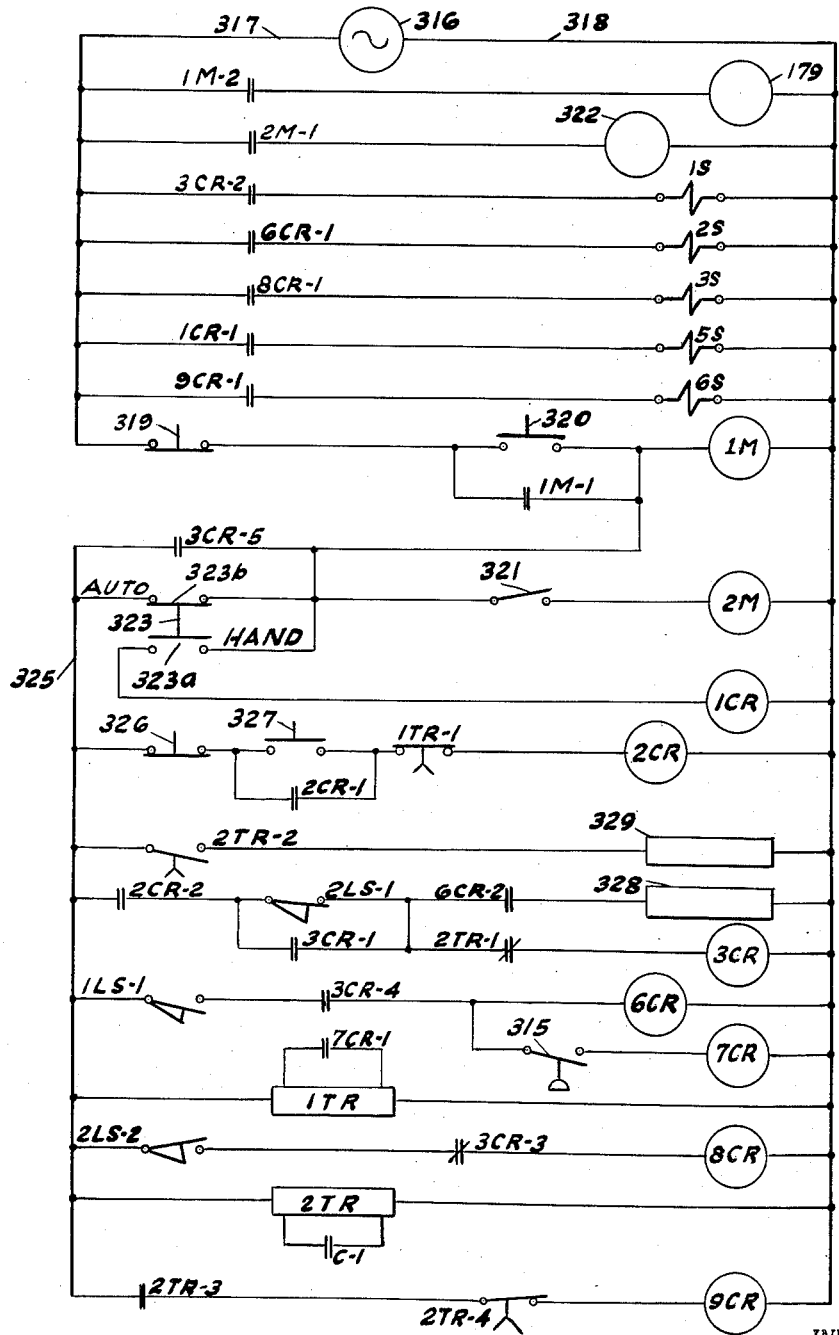
FIG. 12 is a diagram of the electrical circuit of the present invention.

The electric circuit for operation of the feeding mechanism is shown in FIG. 12. Lines 317 and 318 are connected to the respective sides of a source of power 316.

The relay 1M is connected across these lines in series with the normally closed stop switch 319 and the normally open start switch 320, the relay 1M being sealed in through its own contact 1M–1 after momentary operation of the start switch 320. Energization of relay 1M closes the normally open contact 1M–2 to start the motor of the hydraulic pump 179. Relay 2M, upon closing of switch 321, is connected across lines 317 and 318 through the switch 319 and contacts 1M–1, and its contacts 2M–1 are closed to energize the grinding wheel motor 322. When the switch 323 is thrown to close contacts 323b, the line 325 is connected to line 317, and hence the source 316, through those contacts, contacts 1M–1, and switch 319. Relay 2CR is connected across lines 325 and 318 and in series with normally closed stop switch 326, normally open push button start switch 327, and the normally closed delay open contact 1TR–1. When the push button switch 327 is momentarily closed relay 2CR is energized and sealed in through its normally open contact 2CR–1 connected across the push button switch 327.

When the shaft 22 and hence the wheelhead is fully retracted, the limit switch 2LS is operated and the normally open switch contacts 2LS–1 thereof are closed. Normally open contacts 2CR–2 close after the relay 2CR is energized and therefore the relay 3CR is energized since the normally closed contact 2TR–1 is closed at this time. This closes normally open contact switch 3CR–1, which is connected across the limit switch contact 2LS–1, to seal in relay 3CR. Normally open contact 3CR–2 is also closed, energizing solenoid 1S, to commence rapid forward advance of the shaft 22.

When the wheelhead shaft 23 engages shaft 24 the limit switch 1LS is operated and the normally open contact 1LS–1 thereof is closed. The normally open contact 3CR–4 is also closed and therefore the relay 6CR, which is connected in series with contacts 1LS–1 and 3CR–4 across lines 325 and 318, is energized, closing the normally open contacts 6CR–1 and energizing solenoid 2S. This initiates the forward feeding movement of shaft 24, and hence the wheelhead. When the valve mechanism is operated at the end of the forward feed of the feed piston, and the pressure switch 315 is thereby operated, the relay 7CR is energized, closing the normally open contacts 7CR–1. This initiates the timing cycle of timer 1TR which is connected across the lines 325 and 318. After a predetermined time has elapsed for spark out, contacts 1TR–1 time open to deenergize the relay 2CR, and hence the relay 3CR. Relay 8CR is connected across lines 325 and 318 in series with the normally closed contacts 2LS–2 of limit switch 2LS and the normally closed contacts 3CR–3 of relay 3CR. Thus, when relay 3CR is deenergized, relay 8CR is energized to close contacts 8CR–1 and thereby energize solenoid 3S. This causes retraction of the feed piston, and hence reverse movement of the feed shaft 24. Simultaneously, contacts 3CR–2 are opened to deenergize solenoid 1S and permit retraction of the rapid advance shaft 22 by virtue of pressure in cylinder 42.

A counter having a counting unit 328 and a reset mechanism 329 is connected across lines 325 and 318, the former unit in series with normally open contacts 2CR–2 and 6CR–2 and parallel connected contacts 2LS–1 and 3CR–1, and the latter unit in series with normally open delay close contact 2TR–2. On each cycle the counter unit 328 is energized and deenergized and, after a predetermined number of cycles, the counter contact C1 is closed, said contact closing after the deenergization of the counter on the predetermined cycle. This begins operation of the timer 2TR connected across the lines 325 and 318, closing the normally open switch 2TR–3. This energizes the relay 9CR which is connected across lines 325 and 318 in series with contacts 2TR–3 and the normally closed delay open contact 2TR–4. When relay 9CR is energized the normally open contacts 9CR–1 are closed to energize solenoid 6S and begin the operation of the compensating unit 53. After a predetermined time required for the operation of the compensation unit the contacts 2TR–4 time open and thereafter the contacts 2TR–2 times close to energize the reset unit 329 and thereby reset the counter mechanism.

If manual adjustment of the zone of movement of the wheelhead is desired, the selector switch 323 is operated to disconnect contacts 323b and connect contacts 323a, the line 325 being sealed in through the normally open contacts 3CR–5 until relay 3CR is deenergized. When contacts 323a are closed relay 1CR is energized, closing normally open contacts 1CR–1 and thereby energizing solenoid 5S. This disengages clutch mechanism 70 and engages clutch mechanism 68, connecting the handwheel 52 to the wheelhead shaft 23.

In the operation of the feed mechanism of the present invention the rate valves RA, RB, and RC are initially adjusted to produce the three desired forward feeding rates. The control valves are then adjusted axially to position the plungers the desired distance from the cam face 157. The plunger of control valve CA is positioned relative to the cam portion 270A in registration therewith so that the plunger is depressed at a desired point in the forward feed travel of the wheelhead, to switch from the "coarse" feed of rate valve RA to the "fine" feed of rate valve RB. The plunger of control valve CB is positioned relative to the cam portion 270B for depression of the plunger after the operation of valve CA to switch from the "fine" feed rate of value RB to the "extra fine feed" rate of rate valve RC as the workpiece approaches final size. The plunger of control valve CC is positioned relative to cam portion 270C to terminate the reverse travel of the feed shaft 24 at a desired position.

The wheelhead shaft 23 is continuously urged against rapid advance shaft 22 because of pressure maintained in cylinder 42 and, when the shaft 22 is retracted, the forward end of the wheelhead shaft is spaced from the feed shaft 24 when it is in its retracted position. When the cycle is begun pressure is introduced to chamber 193 of cylinder block 25, the force exerted on the piston 28 being greater than the force exerted in cylinder 42 urging shaft 23 rearwardly, so the shaft 22 is rapidly advanced, without rotation, toward the feed shaft 24. As piston 28 moves toward the left end of cylinder block 25, shaft 23, which also moves without rotation, engages shaft 24 and limit switch 1LS is operated to shift the reversing valve 219 to the right hand position and commence forward feed movement of shaft 24, without rotation, by the hydraulic motor comprising the piston 145 and feed cylinder 143. This puts pressure in line 239 and, as shown in FIG. 10, in line 294, and lines 295a and 295b, to produce pressure at port 293A to valve CA connected to line 295a and at port 293B of port CB connected to line 295b. The pressure at these ports condition these valves for subsequent operation of these valves on depression of the plungers 241A and 241B thereof. With the valve member 238 of reverse valve 219 in the right hand position line 240 is connected to exhaust and port 293C of valve CC, which is connected to line 240 through line 282a and line 282, is therefore connected to exhaust and the valve is not conditioned for operation even though the plunger thereof may be depressed.

In FIG. 11 the solid lines in the control valve CA and CB represent passages therethrough when the respective valves are not operated by the cam, and the dotted lines represent the alternate passages provided when the valve members are fired to their operated positions after engagement of the plungers by the cam. When the reverse valve is in the right hand position for forward feeding movement, the portion of the circuit containing control valve CC is rendered ineffective by check valve 281 which prevents flow through the valve CC at this time, and flow occurs through the network comprising rate valves RA, RB, RC, control valves CA, CB, valve 283, and the connecting lines 280b, 280c, 280d, 289, 291, 290, 284 in accordance with the condition of the control valves CA and CB of the network. When control valves CA and CB are adjusted for successive operation flow occurs initially through line 280d, rate valve RA, line 289, rate valve CA, line 290, rate valve CB, and line 284. When control valve CA is operated flow occurs through line 280c, rate valve RB, line 291, control valve CA, line 290, control valve CB, and line 284. When control valve CB is operated flow occurs through line 280b, rate valve RC, line 292, control valve CB, and line 284.

Axial adjustment of the control valves CA and CB can be utilized to eliminate any one or two of the feed rates without adjustment of the cam 155 or the rate valves RA, RB, or RC, as shown in FIGS. 10 and 11. If control valve CA is adjusted so it is not operated by cam portion 270A during the cycle, flow continues through the rate valve RA until control valve CB is operated. This stops flow through valve RA and unblocks valve RC. If control valves CA and CB are adjusted so that neither is operated during the cycle, flow occurs only through rate valve RA for the entire forward feeding movement. If control valve CA is adjustably shifted toward the cam so that its plunger is continuously depressed thereby, flow will occur through rate valve RB until control valve CB is operated, at which time flow through rate valve RB will be blocked and flow through rate valve RC unblocked. If valve CB is adjusted so that its plunger is continuously depressed, flow will occur only through rate valve RC regardless of the condition of control valve CA. Pressure is maintained in chamber 193 after the shaft 24 commences its controlled feeding movement and shaft 22 urges the wheelhead shaft 23 against shaft 24 during the entire forward feeding movement to clamp the wheelhead between said abutting shafts.

After the grinding operation, the valve member of reverse valve 219 is shifted to the left, connecting line 240 to pressure and line 239 to exhaust. The check valve 283, as shown best in FIG. 11, renders the network ineffective, and pressure is introduced to port 293C of valve CC to condition that valve for operation when the plunger is depressed by movement of the cam surface in the direction of arrow B to the position shown in FIG. 10. Depression of the plunger operates the valve to block the flow therethrough and the hydraulic feed motor is stopped to terminate retraction of the feed shaft. At the same time the feed shaft begins to retract pressure is relieved from chamber 193 of piston block 25, so that all three shafts simultaneously return to their retracted positions, the shaft 22 being returned by the force in cylinder 42 exerted through the wheelhead shaft 23.

The hydraulic clutch mechanism 70 is normally engaged to connect the wheelhead shaft 23 to the compensation unit for periodic adjustment of the zone of movement of the wheelhead to compensate for wear of the grinding wheel. When manual adjustment of the wheelhead is desired, the clutch mechanism 70 is disengaged, and the clutch mechanism 68 engaged, by operation of selector switch to connect the wheelhead shaft 23 to the handwheel 52. However, precise determination of the final forward position of the wheelhead is achieved by adjustment of knob 172 to axially position the valve 165 which signals completion of the forward movement of the wheelhead and which has a stop surface thereon to arrest the movement of the feed piston at the precise desired forward position of the wheelhead.

What is claimed is:
1. In a grinding machine having one member to rotatably support a grinding wheel and another member to support a workpiece, one of said members being movable relative to the other to effect grinding of the workpiece, the combination comprising a first shaft operatively connected to said one member and supported solely thereby for movement of said member on axial movement of said first shaft, said shaft and said member being relatively adjustable to adjust the zone of movement of said one member on movement of said first shaft, a feed shaft aligned with said first shaft at one end thereof, means operatively connected to said feed shaft to move axially the feed shaft in controlled feeding movement, a rapid advance shaft aligned with said first shaft at the opposite end thereof, and means to move axially said rapid advance shaft toward the feed shaft to advance said first shaft to said feed shaft and clamp the first shaft between the feed shaft and rapid advance shaft for feeding movement of said one member.

2. In a grinding machine having a workpiece supporting means, a base, and a wheelhead mounted on the base for movement in a path towards and away from the workpiece supporting means, the combination comprising a first axially movable shaft mounted in the base parallel to said path and having a retracted position, a threaded shaft supported solely by the wheelhead aligned with said first shaft and having one end urged against the forward end thereof, an axially movable feed shaft mounted in the base aligned with the wheelhead shaft and having a retracted position spaced from the end of the wheelhead shaft opposite said first shaft when said first shaft is in the retracted position, means to advance the first shaft to advance the wheelhead shaft to the feed shaft and urge said wheelhead shaft against the feed shaft, means to move the feed shaft a predetermined distance after the wheelhead shaft is engaged therewith whereby the wheelhead shaft is advanced between the first shaft and the feed shaft, and means selectively to adjust the wheelhead relative to the wheelhead shaft to shift the zone of movement of the wheelhead.

3. In a grinding machine having a workpiece supporting means, a base, and a wheelhead mounted on the base for advancing and retracting movement in a path towards and away from the workpiece supporting means, said wheelhead having a depending portion extending into the base, a first shaft mounted in the base parallel to said path and axially movable in the advance direction from a predetermined retracted position, a second shaft mounted in the base in front of said first shaft, said second shaft aligned with the first shaft and axially movable in the advance direction from a predetermined retracted position, a shaft threadedly engaged in the depending portion of the wheelhead and supported solely thereby received between said first shaft and said second shaft in alignment therewith, means to bias said wheelhead to continuously urge said wheelhead shaft against said first shaft, said wheelhead shaft spaced from said second shaft when the wheelhead shaft is urged against the first shaft and said first and second shafts are in their retracted positions, a first hydraulic motor, means to render said first hydraulic motor effective to advance said first shaft axially from its retracted position against the bias of the wheelhead shaft to move the wheelhead shaft to said second shaft and urge said wheelhead shaft thereagainst, a second hydraulic motor, means to render said second hydraulic motor effective to advance said second shaft axially at a feed rate while the first hydraulic motor is effective and after the wheelhead shaft is enagged with the second shaft for advance of the wheelhead shaft at a feed rate clamped between the first and second shafts, and means selectively to adjust the wheelhead relative to the wheelhead shaft for adjustment of the zone of movement of the wheelhead.

4. In a grinding machine having a workpiece supporting means, a base, and a wheelhead mounted on the base for movement in a path towards and away from the workpiece supporting means, said wheelhead having a depending portion extending into the base, the combination comprising a first shaft slidably mounted in the base parallel to said path and axially movable toward the workpiece supporting means from a predetermined retracted position, a feed nut mounted in the base between said first shaft and the workpiece supporting means, a threaded feed shaft mounted in said nut, a nut mounted in the depending portion of the wheelhead, a wheelhead shaft threadedly engaged in the wheelhead nut and received between said first shaft and said feed shaft in alignment therewith, a hydraulic piston and cylinder operatively connected between the base and the wheelhead continuously to urge the wheelhead shaft against the first shaft, a first hydraulic motor operatively connected to said first shaft, means to render said first hydraulic motor effective to overcome the piston and cylinder and move the first shaft and wheelhead shaft to the feed shaft and urge said wheelhead shaft into engagement therewith, a hydraulic feed motor operable to effect relative rotation between the feed shaft and the feed nut for movement of the feed shaft axially toward the workpiece supporting means and feeding movement of the wheelhead shaft urged thereagainst, means operable to reverse the feed motor and render the piston and cylinder effective to overcome the first hydraulic motor to retract the shafts away from the workpiece supporting means, and means for selective relative rotation of the wheelhead nut and wheelhead shaft adjustable to shift the zone of movement of the wheelhead relative to the zone of movement of the wheelhead shaft.

5. In a grinding machine having means to support a workpiece, a wheelhead having a rotatable grinding wheel supported thereby, power operated means to effect relative feeding movement between the grinding wheel and the workpiece, and a control system to regulate said relative feeding movement, the combination comprising a cam having a sloping cam surface movable in coordination with the feeding movement, a control member connected into the control system to alter the feeding movement when operated, said control member having a plunger extending therefrom and movable for operation of the control member, means to mount the control member adjacent the cam with the plunger thereof in registration with the cam surface, the control member being selectively movable in said mounting means relative to the cam to position the plunger at a selected distance from the cam surface for operation of the control member at a predetermined position of the feeding movement.

6. In a grinding machine having a machine member to support a workpiece and a machine member to support a rotatable grinding wheel, power operated means operatively connected to one of said members to effect feeding movement of said member relative to the other member, and a control system to regulate said feeding movement, the combination comprising a cam movable in coordination with the feeding movement of said one member and having a cam face, a plurality of control members connected into the control system each effective to alter the feeding movement when operated, said control members each having a plunger extending therefrom and movable for operation of the control member, means to mount the control members adjacent the cam with the plunger of each in registration with said cam face, each control member being selectively movable in said mounting means relative to the cam face to position its plunger at a selected distance from said cam face for successive operation of the control members at predetermined positions of said one member during feeding.

7. A mechanism according to claim 6 in which at least one of said control members is selectively movable relative to the cam to position the plunger beyond the reach of said cam face to render said control member inoperative to alter the feeding movement.

8. A mechanism according to claim 6 in which at least one of said control members is selectively movable relative to the cam to position the plunger for engagement by the cam face during the entire feeding movement to render said control member inoperative to alter the feeding movement.

9. In a grinding machine having a machine member to support a workpiece and a machine member to support a rotatable grinding wheel, the machine having an axially movable feed shaft to effect feeding movement of one of said members toward the other member for grinding, power operated means for reversibly moving said shaft, and a control system to regulate said power operated means, the combination comprising a first control member connected into the control system effective to alter the rate of movement of the feed shaft when operated and a second control member connected into the control system effective to terminate the movement of the feed shaft when operated, said control members each having a plunger extending therefrom and movable for operation of the control member, a cam reversibly movable in coordination with the reversible movement of the feed shaft and having a sloping cam surface in registration with each of said control members, the cam surface in registration with the first control member sloping in a direction to engage the plunger thereof as the feed shaft moves to move said one machine member toward the other member and the cam surface in registration with the second control member sloping in the opposite direction to engage the plunger thereof as the feed shaft moves in the opposite direction.

10. In a grinding machine having a machine member to support a workpiece and a machine member to support a rotatable grinding wheel, the combination of a feed shaft to effect feeding movement of one of said members toward the other member for grinding, power operated means operatively connected to said shaft to effect movement thereof, a control system to regulate said power operated means including a first control valve effective to alter the rate of movement of the feed shaft when operated and a second control valve effectiv to terminate the movement of the feed shaft when operated, said control valves each having a plunger extending therefrom and depressable for operation of the control valve when the control valve is conditioned for operation, a reversing valve operatively connected to said power operated means and said control valves, said reversing valve operable in one position to effect movement of the feed shaft in one direction and conditon the first control valve for operation and operable in a second position to effect reverse movement of said shaft and condition the second control valve for operation, a cam reversibly movable in coordination with the reversible movement of the feed shaft and having a sloping cam surface in registration with each of said control valves, the cam surface in registration with the first control valve sloping in a direction to depress the plunger thereof as the feed shaft moves in said one direction and the cam surface in registration with the second control valve sloping in the opposite direction to depress the plunger thereof as the feed shaft moves in the reverse direction.

11. A mechanism according to claim 10 in which the first control valve is selectively movable relative to its cam surface between a position where the plunger thereof is beyond the reach of the cam surface and a position where said plunger is continuously engaged by said cam surface and in which the second control valve is selectively movable relative to its cam surface to position the plunger for engagement by the cam surface at a predetermined retracted position of the feed shaft.

12. In a grinding machine having means to support a workpiece, a movable wheelhead having a rotatable grinding wheel supported thereby, means including a feed shaft to move the wheelhead toward the workpiece supporting means, power operated means operatively connected to the feed shaft to effect movement thereof, and a control system to regulate said movement of the feed shaft, the combination comprising a cam rotatable about an axis through a predetermined angle in coordination with the movement of the feed shaft and having a plurality of sloping cam surfaces on one face thereof, a valve block adjacent the cam and having a plurality of hydraulic valves mounted therein disposed about the axis of the cam, said hydraulic valves connected into the control system and each effective to alter the movement of the feed shaft when operated, each of said valves having a valve bushing and a movable plunger normally urged to an extended position with one end thereof extending beyond the bushing, said plunger effective when depressed to operate the valve, each of the valve plungers in registration with one of the cam surfaces as the cam rotates through said predetermined angle, and each of the bushings selectively movable relative to the cam to position said one end of its valve plunger in its normal extended position a selected distance from its corresponding cam surface for operation of the control valve at a predetermined position of the feed shaft.

13. In a grinding machine having a member to support a workpiece and a member to support a grinding wheel, a hydraulic motor to effect relative feeding movement between said members in response to the flow of hydraulic fluid to said motor, a hydraulic control circuit operatively connected to said motor to regulate the flow of fluid thereto including a network in said circuit comprising a first rate valve and a second rate valve, a control valve connected to said first and second rate valves normally to pass fluid from one of said connected valves and block fluid from the other of said connected valves and effective when operated to pass fluid from said other of said connected valves and block fluid from said one of said connected valves, a third rate valve, a second control valve connected to said first control valve and said third rate valve normally to pass fluid from one of said connected valves and block fluid from the other of said connected valves and effective when operated to pass fluid from said other of said connected valves and block fluid from said one of said connected valves whereby flow occurs through only one rate valve of said network, and means selectively to operate said control valves.

14. In a grinding machine having a member adapted to support a workpiece and a member adapted to support a grinding wheel, the combination of a feed shaft movable in one direction to effect relative feeding movement between said members for grinding, a hydraulic motor operatively connected to said feed shaft, a reverse valve operatively connected to said hydraulic motor to effect reverse movement of said shaft, a cam operatively connected to said feed shaft for rotation in one direction as the feed shaft is moved in said one direction and rotation in the opposite direction as the feed shaft is moved in said reverse direction, said cam having a pair of oppositely sloping cam surfaces, a pair of rate valves connected in circuit with said hydraulic motor, a first control valve having an extending plunger, said valve operatively connected to said rate valves to regulate the flow therethrough and effective when conditioned for operation to alter the rate of said hydraulic motor upon depression of the plunger, a second control valve having an extending plunger and effective when conditioned for operation to terminate operation of said hydraulic motor upon depression of the plunger, means to mount said control valves with the plungers thereof in registration with said cam surfaces, said control members being adjustable to position the plungers thereof a selected distance from the cam surfaces, and means connecting the control valves to the reverse valve to condition the first control valve for operation as the feed shaft is moved in said one direction and the cam rotates in said one direction and to condition the second control valve for operation as the feed shaft is reversely moved and the cam is rotated in the opposite direction.

15. In a grinding machine having a member adapted to support a workpiece and a member adapted to support a grinding wheel, the combination of a feed shaft, means to effect engagement between one of said machine members and the feed shaft, a hydraulic motor operatively connected to said feed shaft for movement thereof, a reversing valve operatively connected to said hydraulic motor and shiftable between a first position to move said shaft in one direction and a second position to move said shaft in the opposite direction, a network including a first control valve and two rate valves connected in circuit with the hydraulic motor and the reverse valve and having means to render said network effective only when the reverse valve is in said first position, said control valve connected to said rate valves and normally effective to block flow through one of said rate valves and pass flow through the other of said rate valves, said control valve effective to pass flow through said one rate valve and block flow through said other rate valve upon operation of the valve, a second control valve connected in circuit with the hydraulic motor and the reverse valve, means to render said second control valve effective only when the reverse valve is in said second position, said control valve normally effective to pass flow therethrough and effective when operated to block flow, means responsive to movement of the feed shaft in said one direction to operate said first control valve and alter the rate of movement of said shaft as it moves in said one direction, and means responsive to movement of the feed shaft in the opposite direction to operate said second control valve and terminate said movement of the feed shaft.

16. In a grinding machine having a base, a wheelhead mounted on the base, and a threaded shaft and nut mechanism operatively connected to the wheelhead to adjust the zone of movement of the wheelhead, the combination of a gear having peripheral teeth operatively connected to the shaft and nut mechanism and having teeth on each face, a pair of clutch members mounted on each side of said gear having teeth in registration with the teeth on the respective faces of the gear and movable towards and away from said gear for engagement and disengagement therewith, power actuated compensating means operatively connected to one of said clutch members, a handwheel opertaively connected to the other clutch member, means normally to hold said one clutch member engaged with said gear and to hold said other clutch member disengaged therefrom, means periodically to operate said compensating means after a predetermined number of grinding operations to rotate said gear a predetermined amount and move the wheelhead a predetermined amount relative to said shaft and means selectively to disengage said one clutch member and engage said other clutch member for manual adjustment of the wheelhead relative to the shaft.

17. In a grinding machine having a base, a wheelhead mounted on the base, and a threaded shaft and nut mechanism operatively connected to the wheelhead for adjustment of the zone of movement of the wheelhead, the combination of a gear mounted on a shaft and having peripheral teeth connected to the shaft and nut mechanism, said gear having teeth on each face, a cylinder mounted on said shaft on each side of said gear having a piston slidably received therein and nonrotatable relative thereto for advancement towards and retraction away from said gear, said cylinders rotatable relative to each other, each of said pistons having an end face toward said gear with teeth thereon in registration with the teeth on the faces of the gear, power actuated compensating means operatively connected to one of said cylinders, a handwheel operatively connected to the other of said cylinders, hydraulic power means to advance and retract said pistons, control means including a hydraulic valve normally to advance the piston in said one cylinder and retract the piston in said other cylinder, means periodically to operate said compensating means after a predetermined number of grinding operations to rotate said one cylinder a predetermined amount and move the wheelhead a predetermined amount relative to said shaft, and means selectively to operate said hydraulic valve simultaneously to advance the piston in said other cylinder and retract the piston in said one cylinder for rotation of said other cylinder by the handwheel and selective positioning of the wheelhead relative to the shaft.

18. In a grinding machine having workpiece supporting means, a base, a wheelhead mounted on the base for movement towards and away from said workpiece supporting means, and a threaded feed shaft and nut to effect movement of the wheelhead on the base, the combination of a hydraulic feed motor comprising a cylinder and a piston slidably received in the cylinder, a member threadedly received in one end of the cylinder and having an inner terminal abutment surface to engage the piston and arrest its movement toward said one end of the cylinder, said member rotatable in the cylinder for axial positioning of said abutment surface relative to the cylinder, and a gear train connected to the hydraulic motor to effect relative rotation of the nut and feed shaft and move the wheelhead toward the workpiece supporting means when the piston moves toward said one end of the cylinder.

19. In a grinding machine having workpiece supporting means, a base, a wheelhead mounted on the base for movement towards and away from said workpiece supporting means, and a threaded feed shaft and nut to effect movement of the wheelhead on the base, the combination of a hydraulic feed motor comprising a cylinder and a piston slidably received in the cylinder, a bushing threadedly received in one end of the cylinder and having an inner terminal abutment surface to engage the piston and arrest its movement toward said one end of the cylinder, said bushing rotatable in the cylinder for axial positioning of said abutment surface relative to the cylinder, a plunger slidably received in the bushing and normally extending inwardly beyond said abutment surface for shifting by the piston as it approaches said abutment surface, a gear train connected to the hydraulic motor to effect relative rotation of the feed shaft and nut and move the wheelhead toward the workpiece supporting means when the piston moves toward said one end of the cylinder, and means responsive to the shifting of the plunger by the piston to reverse the movement of the piston after it has been arrested by the abutment surface.

20. In a grinding machine having workpiece supporting means, a base, a wheelhead mounted on the base for movement towards and away from said workpiece supporting means, and a threaded feed shaft and nut to effect movement of the wheelhead on the base, the combination of a hydraulic feed motor comprising a cylinder and a piston slidably received in the cylinder, a bushing threadedly received in one end of the cylinder and having an inner terminal abutment surface to engage the piston and arrest its movement toward said one end of the cylinder, means to rotate said bushing for axial positioning of said abutment surface relative to the cylinder, a valve plunger slidably received in the bushing and normally extending inwardly beyond said abutment surface for shifting by the piston as it approaches said abutment surface, a gear train connected to the hydraulic motor to effect relative rotation of the nut and shaft and move the wheelhead toward the workpiece supporting means when the piston moves toward said one end of the cylinder, control means operable when actuated to reverse the piston, and time delay means actuated in response to the shifting of the valve plunger and operable a predetermined time after actuation to actuate said control means.

21. In a grinding machine having workpiece supporting means, a base, a wheelhead mounted on the base for movement towards and away from said workpiece supporting means, and a feed shaft and nut to effect movement of the wheelhead on the base, the combination of a source of pressure, a hydraulic feed motor comprising a cylinder and a piston slidably received in the cylinder, a valve bushing threadedly received in one end of the cylinder and having an inner terminal abutment surface to engage the piston and arrest its movement toward said one end of the cylinder, means to rotate said bushing for axial positioning of said abutment surface relative to the cylinder, a valve plunger slidably received in the bushing and normally extending inwardly beyond said abutment surface for shifting by the piston as it approaches said abutment surface, a gear train connected to the hydraulic motor to effect relative rotation of the nut and shaft and move the wheelhead toward the workpiece supporting means when the piston moves toward said one end of the cylinder, a pressure switch connected through the valve bushing to the source of pressure for operation thereof when the valve plunger is shifted by the piston, a reversing valve connected to the source of pressure and operable when actuated to divert the pressure from one end of the cylinder to the other, and a timer actuated in response to operation of the pressure switch and operable a predetermined time after actuation to actuate the reversing valve.

22. In a grinding machine having a workpiece supporting means and a wheelhead the combination of a source of pressure, a hydraulic feed motor to effect feeding movement of the wheelhead toward the workpiece supporting means, and a hydraulic circuit connecting the source of pressure to the feed motor, said hydraulic circuit including a network in series with the motor including a control valve, a pair of parallel connected branch lines each having a rate valve therein and terminating at the control valve, the control valve normally blocking one of said branch lines and connecting the other of said branch lines into the circuit, said control valve effective when operated to block said other line and connect said one line into the circuit, and means coordinated with the movement of the wheelhead towards said workpiece supporting means to operate said control valve.

23. In a grinding machine having a workpiece supporting means, a wheelhead, a source of pressure, a hydraulic feed motor to effect relative feeding movement between the workpiece supporting means and the wheelhead, and a hydraulic circuit connecting the source of pressure to the feed motor, the combination therewith of a network in the hydraulic circuit including a first control valve and two rate valves connected thereto, said first control valve normally effective to block flow through one of said valves connected thereto and pass flow through the other of said valves connected thereto, said first control valve effective to pass flow through said one valve connected thereto and block flow through said other valve connected thereto upon operation of said first control valve, a second control valve, a third rate valve, said third rate valve and said first control valve connected to the second control valve, said second control valve normally effective to block flow through one of said valves connected thereto and pass flow through the other of said valves connected thereto, said second control valve effective to pass flow through said one valve connected thereto and block flow through said other rate valve connected thereto upon operation of said second control valve, and means coordinated with said feeding movement successively to operate said first and second control valves.

24. The mechanism of claim 23 in which the control valve operating means is a cam operatively connected to the hydraulic motor for coordinated movement with the wheelhead and in which said control valves have plunger adapted for engagement by the cam, each of said control valves adjustable relative to the cam from a position where said plunger is beyond the reach of said cam during feeding movement to a position where said plunger is continuously engaged by said cam.

25. The mechanism of claim 15 in which said control valves have plungers and in which said control valve operating means is a cam operatively connected to the hydraulic motor for coordinated movement with the feed shaft, said cam having two oppositely sloping cam portions, one of said cam portions adapted to engage the plunger of the first control valve for operation thereof as the feed shaft moves in said one direction and the other of said cam portions adapted to engage the plunger of the second control valve as the feed shaft moves in the opposite direction.

26. In a grinding machine having a base, a wheelhead mounted on the base and having a wheelhead shaft depending into the base, the wheelhead shaft having an abutment on one end, a feed shaft mounted in the base having an abutment surface on one end, one of said abutment surfaces comprising a ball and the other abutment surface comprising a radially shiftable seat to receive the ball, means to urge the abutment surface of the wheelhead shaft against the abutment surface of the feed shaft, and means to move the feed shaft axially.

27. In a grinding machine having a base and having means to support a workpiece, a wheelhead having a grinding wheel rotatably mounted therein movably mounted on the base for advance and retraction relative to the workpiece supporting means, a first member mounted in the base and movable therein from a retracted position, a second member mounted in the wheelhead and supported solely thereby having a retracted position abutting against the forward end of said first member when said first member is in the retracted position, said second member adjustable relative to the wheelhead to alter the zone of movement of the wheelhead on movement of said second member, a third member mounted in the base in registration with the forward end of said second member, said third member movable from a retracted position spaced from the forward end of said second member when said second member is in the retracted position, power operated means to advance said first member rapidly to advance said second member into abutting engagement with said third member, and power operated means to advance said third member at a feed rate after said second member has abutted thereagainst to advance said second member and the wheelhead in feeding movement.

References Cited in the file of this patent

UNITED STATES PATENTS

| | | |
|---|---|---|
| 1,198,613 | Bright | Sept. 19, 1916 |
| 2,745,221 | Comstock | May 15, 1956 |
| 2,936,552 | Schultze et al. | May 17, 1960 |